(12) United States Patent
Jernigan et al.

US007786247B2

(10) Patent No.: US 7,786,247 B2
(45) Date of Patent: Aug. 31, 2010

(54) HIGH IV MELT PHASE POLYESTER POLYMER CATALYZED WITH ANTIMONY CONTAINING COMPOUNDS

(75) Inventors: Mary Therese Jernigan, Kingsport, TN (US); Michael Paul Ekart, Kingsport, TN (US); Richard Gill Bonner, Kingsport, TN (US)

(73) Assignee: Eastman Chemical Company, Kingsport, IN (US)

( * ) Notice: Subject to any disclaimer, the term of this patent is extended or adjusted under 35 U.S.C. 154(b) by 0 days.

(21) Appl. No.: 11/361,487

(22) Filed: Feb. 24, 2006

(65) Prior Publication Data

US 2006/0149026 A1    Jul. 6, 2006

Related U.S. Application Data

(62) Division of application No. 10/796,238, filed on Mar. 9, 2004, now Pat. No. 7,358,322.

(51) Int. Cl.
C08G 63/02     (2006.01)
C08G 63/00     (2006.01)

(52) U.S. Cl. .................. 528/272; 502/102; 502/103; 502/150; 502/311; 502/312; 528/271; 528/274; 528/275; 528/285; 528/308.5; 558/325; 558/326

(58) Field of Classification Search ............... 502/150, 502/102, 103, 311, 312; 528/271, 272, 274, 528/275, 285, 308.5; 558/325, 326
See application file for complete search history.

(56) References Cited

U.S. PATENT DOCUMENTS

| | | | |
|---|---|---|---|
| 3,451,971 A | 6/1969 | Lazarus | |
| 3,624,040 A | 11/1971 | Rath et al. | |
| 3,631,153 A | 12/1971 | Carter et al. | |
| 3,673,139 A | 6/1972 | Hrach | |
| 3,880,582 A | 4/1975 | Sawaya | |
| 4,093,593 A | 6/1978 | Go | |
| 4,100,142 A | 7/1978 | Schaefer et al. | |
| 4,260,735 A | 4/1981 | Bander et al. | |
| 4,289,871 A | 9/1981 | Rowan et al. | |
| 4,330,661 A | 5/1982 | Go | |
| 4,357,461 A | 11/1982 | Go et al. | |
| 4,401,804 A | 8/1983 | Wooten et al. | |
| 4,424,337 A | 1/1984 | Smith et al. | |
| 4,447,595 A | 5/1984 | Smith et al. | |
| 4,501,878 A | 2/1985 | Adams | |
| 4,609,721 A | 9/1986 | Kirshenbaum et al. | |
| 4,613,664 A | 9/1986 | Tate et al. | |
| 4,617,374 A | 10/1986 | Pruett et al. | |
| 4,619,987 A | 10/1986 | Saiki et al. | |
| 4,647,650 A | 3/1987 | Sasaki et al. | |
| 4,764,323 A | 8/1988 | Al Ghatta | |
| 4,837,115 A | 6/1989 | Igarashi et al. | |
| 5,049,647 A | 9/1991 | Al-Ghatta | |
| 5,104,965 A | 4/1992 | Jenkins et al. | |
| 5,235,027 A | 8/1993 | Thiele et al. | |
| 5,250,333 A | 10/1993 | McNeely et al. | |
| 5,258,233 A | 11/1993 | Mills et al. | |
| 5,266,413 A | 11/1993 | Mills et al. | |
| 5,340,906 A | 8/1994 | Shirokura et al. | |
| 5,372,864 A | 12/1994 | Weaver et al. | |
| 5,384,337 A | 1/1995 | Budinger | |
| 5,384,377 A | 1/1995 | Weaver et al. | |
| 5,567,796 A | 10/1996 | Nakatsukasa et al. | |
| 5,573,820 A | 11/1996 | Harazoe et al. | |
| 5,608,027 A | 3/1997 | Crosby et al. | |
| 5,646,208 A | 7/1997 | Cattron et al. | |
| 5,648,032 A | 7/1997 | Nelson et al. | |
| 5,656,221 A * | 8/1997 | Schumann et al. | ............ 264/85 |
| 5,780,575 A | 7/1998 | Brink et al. | |
| 5,886,133 A | 3/1999 | Hilbert et al. | |
| 5,898,058 A | 4/1999 | Nichols et al. | |
| 5,945,460 A | 8/1999 | Ekart et al. | |
| 5,962,625 A | 10/1999 | Yau | |
| 6,020,421 A | 2/2000 | Fukushima et al. | |
| 6,048,957 A | 4/2000 | Ekart et al. | |
| 6,066,714 A | 5/2000 | Putzig et al. | |
| 6,099,778 A | 8/2000 | Nelson et al. | |
| 6,113,997 A | 9/2000 | Massey et al. | |
| 6,160,085 A | 12/2000 | Fujimori et al. | |
| 6,197,851 B1 | 3/2001 | Maxwell et al. | |
| 6,200,659 B1 | 3/2001 | Fujimori et al. | |
| 6,274,212 B1 | 8/2001 | Rule et al. | |

(Continued)

FOREIGN PATENT DOCUMENTS

AT           259232           1/1968

(Continued)

OTHER PUBLICATIONS

Carl W. Fuller, Colored Iron Oxide Pigments, Synthetic, Pigment Handbook, 1973, pp. 333-349, vol. 1, John Wiley & Sons, New York.

(Continued)

*Primary Examiner*—Terressa M Boykin
(74) *Attorney, Agent, or Firm*—Michael K. Carrier; Bernard J. Graves, Jr.

(57) ABSTRACT

A melt phase process for making a polyester polymer melt phase product by adding an antimony containing catalyst to the melt phase, polycondensing the melt containing said catalyst in the melt phase until the It.V. of the melt reaches at least 0.75 dL/g. Polyester polymer melt phase pellets containing antimony residues and having an It.V. of at least 0.75 dL/g are obtained without solid state polymerization. The polyester polymer pellets containing antimony residues and having an It.V. of at least 0.70 dL/g obtained without increasing the molecular weight of the melt phase product by solid state polymerization are fed to an extruder, melted to produce a molten polyester polymer, and extruded through a die to form shaped articles. The melt phase products and articles made thereby have low b* color and/or high L* brightness, and the reaction time to make the melt phase products is short.

8 Claims, No Drawings

U.S. PATENT DOCUMENTS

| | | |
|---|---|---|
| 6,313,200 B1 | 11/2001 | Finder |
| 6,384,180 B1 | 5/2002 | Jernigan et al. |
| 6,472,500 B2 | 10/2002 | Dhawan et al. |
| 6,500,915 B1 | 12/2002 | Fujimori et al. |
| 6,559,271 B2 | 5/2003 | Schaaf et al. |
| 6,569,991 B2 | 5/2003 | Nichols et al. |
| 6,573,359 B2 | 6/2003 | Nichols et al. |
| 6,590,069 B2 | 7/2003 | Nichols et al. |
| 6,599,596 B2 | 7/2003 | Nichols et al. |
| 6,601,987 B2 | 8/2003 | Finder et al. |
| 2002/0077443 A1 | 6/2002 | Nichols et al. |
| 2002/0091226 A1 | 7/2002 | Nichols et al. |
| 2003/0144459 A1 | 7/2003 | Fujimori et al. |
| 2004/0096609 A1 | 5/2004 | Nichols et al. |
| 2004/0127653 A1 | 7/2004 | Ellington et al. |

FOREIGN PATENT DOCUMENTS

| | | |
|---|---|---|
| DE | 1950553 | 4/1970 |
| DE | 19537930 | 4/1997 |
| EP | 0 921 144 A1 | 9/1999 |
| EP | 1065230 | 1/2001 |
| EP | 1188783 A2 | 3/2002 |
| GB | 1337751 | 11/1973 |
| JP | 73035948 | 11/1968 |
| JP | 46041025 | 12/1971 |
| JP | 46041033 | 12/1971 |
| JP | 7113206 | 3/1972 |
| JP | 48005798 | 1/1973 |
| JP | 48007272 | 3/1973 |
| JP | 48056782 | 8/1973 |
| JP | 48056783 | 8/1973 |
| JP | 48056784 | 8/1973 |
| JP | 48031991 | 10/1973 |
| JP | 48079898 | 10/1973 |
| JP | 48038634 | 11/1973 |
| JP | 48038635 | 11/1973 |
| JP | 48038637 | 11/1973 |
| JP | 49005918 | 1/1974 |
| JP | 49010834 | 1/1974 |
| JP | 49006835 | 2/1974 |
| JP | 49006839 | 2/1974 |
| JP | 49009116 | 3/1974 |
| JP | 48026955 | 4/1974 |
| JP | 49045014 | 4/1974 |
| JP | 490445015 | 4/1974 |
| JP | 50039711 | 4/1975 |
| JP | 47042989 | 6/1975 |
| JP | 51042795 | 4/1976 |
| JP | 51127195 | 11/1976 |
| JP | 51145594 | 12/1976 |
| JP | 52105591 | 9/1977 |
| JP | 52123489 | 10/1977 |
| JP | 52129798 | 10/1977 |
| JP | 52129799 | 10/1977 |
| JP | 47039497 | 1/1978 |
| JP | 53051294 | 5/1978 |
| JP | 53051295 | 5/1978 |
| JP | 53052595 | 5/1978 |
| JP | 53105591 | 9/1978 |
| JP | 54135896 | 10/1979 |
| JP | 54163996 | 12/1979 |
| JP | 55089332 | 7/1980 |
| JP | 55149320 | 11/1980 |
| JP | 56008431 | 1/1981 |
| JP | 57038609 | 8/1982 |
| JP | 58109532 | 6/1983 |
| JP | 59051295 | 3/1984 |
| JP | 60202148 | 10/1985 |
| JP | 60219226 | 11/1985 |
| JP | 62152715 | 7/1987 |
| JP | 62161827 | 7/1987 |
| JP | 62207337 | 9/1987 |
| JP | 62297318 | 12/1987 |
| JP | 62-182065 | 1/1989 |
| JP | 3146707 | 6/1991 |
| JP | 3161509 | 7/1991 |
| JP | 3292323 | 12/1991 |
| JP | 4370142 | 12/1992 |
| JP | 5097990 | 4/1993 |
| JP | 6087953 | 3/1994 |
| JP | 6286088 | 10/1994 |
| JP | 7133412 | 5/1995 |
| JP | 7224218 | 8/1995 |
| JP | 1996003301 | 1/1996 |
| JP | 1996073581 | 3/1996 |
| JP | 1996283398 | 10/1996 |
| JP | 8325364 | 12/1996 |
| JP | 1997040850 | 2/1997 |
| JP | 1997-007952 | 5/1997 |
| JP | 9176464 | 7/1997 |
| JP | 9176465 | 7/1997 |
| JP | 9183892 | 7/1997 |
| JP | 9272793 | 10/1997 |
| JP | 10316765 | 12/1998 |
| JP | 11005892 | 1/1999 |
| JP | 1999152324 | 6/1999 |
| JP | 2001089942 | 3/2000 |
| JP | 2000128970 | 5/2000 |
| JP | 2000128971 | 5/2000 |
| JP | 2000129102 | 5/2000 |
| JP | 2002249648 | 9/2002 |
| JP | 2002249653 | 9/2002 |
| JP | 2003301090 | 10/2003 |
| JP | 2003301093 | 10/2003 |
| JP | 2003306536 | 10/2003 |
| JP | 2003306541 | 10/2003 |
| JP | 2003306601 | 10/2003 |
| JP | 2004149790 | 5/2004 |
| KR | 9303713 | 5/1993 |
| WO | 97/28218 A1 | 7/1997 |
| WO | WO 97/44376 | 11/1997 |
| WO | WO 98/41559 | 9/1998 |
| WO | WO 01/14452 A1 | 3/2001 |
| WO | WO 02/051616 | 7/2002 |

OTHER PUBLICATIONS

Co-pending U.S. Appl. No. 11/154,208, filed Jun. 16, 2005.
Office Action date of mailing Jan. 30, 2007 from co-pending U.S. Appl. No. 11/361,655.
Office Action date of mailing Dec. 1, 2005 received in U.S. Appl. No. 10/796,238.
Office Action date of mailing May 17, 2006 received in U.S. Appl. No. 10/796,238.
Office Action date of mailing Sep. 26, 2006 received in U.S. Appl. No. 10/796,238.
Office Action date of mailing Jul. 19, 2006 received in U.S. Appl. No. 11/361,655.
Office Action date of mailing Jul. 24, 2007 received in U.S. Appl. No. 11/361,655.
Billmeyer, Jr., Fred W. and Saltzman, Max; Describing Color, Chapter 2; Principles of Color Technology, Second Edition; 1981; pp. 25-66; John Wiley & Sons, Inc.; United States of America.
IPOS Search Report dated Mar. 3, 2006 received in Singapore Patent Application No. 200501246-3.
EPO Search Report dated Jun. 16, 2005 received in European Patent Application No. 05 00 4945.
My Search Report dated Aug. 14, 2009 received in Malaysian Patent Application No. PI 20050947.

* cited by examiner

HIGH IV MELT PHASE POLYESTER POLYMER CATALYZED WITH ANTIMONY CONTAINING COMPOUNDS

This application is a divisional application of U.S. application Ser. No. 10/796,238, filed on Mar. 9, 2004, which issued as U.S. Pat. No. 7,358,322 on Mar. 15, 2008.

FIELD OF THE INVENTION

This invention pertains to the manufacture of polyester polymers, and more particularly to the manufacture of high It.V. polyethylene terephthalate polymer and copolymers catalyzed with antimony compounds in the melt phase having good color.

BACKGROUND OF THE INVENTION

In European patent application 1 188 783 A2 and U.S. Pat. No. 6,559,271, a process for making high IV PET in the melt phase is described. In this patent, high IV PET catalyzed with a titanium based compound is described as providing a good compromise between reactivity and selectivity when a low dosage of titanium metal and a low reaction temperature is chosen to obtain optimal increase in molecular weight and reduce the chance of thermal decomposition. By providing a more thermally stable polymer, the level of acetaldehyde ("AA") generated in the polymer is reduced. The amount of AA generated by the described process in the base polymer is not stated, but after addition of an excess amount of AA bonding agent, the contemplated amount of AA in the polymer melt is described as ranging from 1 to 10 ppm directly after polycondensation. Recognizing that AA bonding additives can cause a stronger or weaker yellowing of the polyester polymer, the patent recommends controlling the color imparted by the AA reducing additives by adding bluing toners to the melt.

We have discovered that titanium catalyzed polycondensation reactions impart an unacceptably high yellow color to high It.V. base polyester polymers made in the melt phase as indicated by their high b*, a problem not addressed by U.S. Pat. No. 6,559,271. Adding sufficient amount of bluing toner to overcome the yellow color imparted to the melt by a titanium-catalyzed reaction presents the further problem of having to use higher amounts of bluing toners, which has the potential for reducing the brightness of the polymer and increases the costs for making the polymer composition.

In order to reduce the level of AA in the melt phase polymer, the process described in U.S. Pat. No. 6,559,271 operates the melt phase at a reduced temperature and with a reduced titanium catalyst concentration, i.e. low reaction temperature on the order of 270° C. and less than 10 ppm Ti metal as the catalyst concentration. However, by reducing the reaction temperature and catalyst concentration, the reaction time required to attain the same target molecular weight also increases.

It would be desirable to implement a solution to make a high It.V. polymer in the melt phase with a better, lower b* (a measure of the yellow hue in the polymer). Moreover, it would also be desirable to retain the same or better, shorter reaction times to a target high It.V. in the melt compared to the reaction time needed to obtain the same target It.V. in titanium-catalyzed reactions with an acceptable b* color.

SUMMARY OF THE INVENTION

We have found a process for making a high It.V. polyester polymer melt phase product in which the base polymer from the melt phase has acceptable b* color. In the process, a polyester polymer made in the melt phase with high It.V. now has a better, lower b* color relative to titanium catalyzed reaction products at equivalent reaction times. Surprisingly, we have also discovered a process which allows for wide latitude of catalyst concentrations and polycondensation reaction temperatures while simultaneously obtaining a base polyester polymer having lower b* relative to titanium catalyzed melt phase reactions. We have also discovered that in the process of the invention, the time of reaction to obtain a high It.V. target is shorter than in a titanium-catalyzed process at low titanium catalyst dosages and low reaction temperatures, even though titanium based catalysts are known to be highly active.

There is now provided a melt phase process for making a polyester polymer melt phase product comprising adding an antimony containing catalyst to the melt phase, polycondensing a melt containing said catalyst in the melt phase until the It.V. of the melt reaches at least 0.75 dL/g.

There is also provided polyester polymer melt phase pellets having an It.V. of at least 0.70 dL/g obtained without solid state polymerization and containing antimony residues.

There is further provided a process comprising feeding to an extruder a polyester polymer composition comprising a melt phase product containing antimony residues and having an It.V. of at least 0.70 dL/g obtained without increasing the molecular weight of the melt phase product by solid state polymerization, melting the polyester polymer composition to produce a molten polyester polymer, extruding the molten polyester polymer composition through a die to form shaped articles.

There is also provided a melt phase process for making a polyester polymer melt phase product containing at least 100 ppm antimony based on the weight of the product comprising adding an antimony-containing catalyst to the melt phase; polycondensing a melt containing said catalyst in the melt phase; and before the It.V. of the melt reaches 0.45 dL/g, continuously polycondensing the melt either at a temperature within a range of 265° C. to 305° C. or at sub-atmospheric pressure or a combination thereof, in each case until the It.V. of the melt reaches at least 0.75 dL/g; to produce said polyester polymer melt phase product having a b* color in the range of −5 to +5 (CIELAB units). The color units are always in CIELAB units unless otherwise stated.

There is further provided a melt phase process for making a polyester polymer melt phase product comprising polycondensing a melt in the presence of an antimony-containing catalyst to an It.V. of at least 0.75 dL/g, wherein said product has a b* color of −5 to +5, and an L* of at least 70. The melt phase product optionally contains a bluing toner and/or a reheat enhancing aid made in situ, added to the melt, or added after solidifying the melt, or any combination thereof. The bluing toner is preferably an organic toner.

In yet another embodiment, there is provided a melt phase process for making a polyester polymer melt phase product comprising:

a) esterifying or transesterifying a diol with a a carboxylic acid component comprising dicarboxylic acids, dicarboxylic acid derivatives, and mixtures thereof to produce an oligomeric mixture;

b) polycondensing the oligomeric mixture to produce a polyester polymer melt having an It.V. of at least 0.75 dL/g; and c) adding an antimony compound to the melt phase before the It.V. of the polyester polymer melt reaches 0.45 dL/g; and d) optionally adding a stabilizer to the melt phase;

wherein the polyester polymer melt phase product has a b* color of −5 to +5.

Preferably, polycondensation catalysts added to the polycondensation zone are free of titanium-containing compounds, and in a direct esterification process, the entire melt phase reaction proceeds in the absence of titanium-containing compounds, and most preferably, in an ester exchange route, the entire melt phase reaction also proceeds in the absence of titanium-containing compounds. In yet another embodiment, the only polycondensation catalyst added to the melt phase in a direct esterification process is an antimony containing compound(s).

There is also provided a process for making a polyester polymer by melt phase polymerizing a melt in the presence of an antimony-containing catalyst to produce a melt phase product, wherein the reaction time of the melt between an It.V. of 0.45 to an It.V. in the range of 0.70 dL/g to 0.90 dL/g is 100 minutes or less. Preferably, the pressure applied within this range is about 2 mm Hg or less. Moreover, the melt phase product produced by this process has a b* within a range of −5 to +5.

There is also provided polyester polymer having a degree of crystallinity of at least 25% and an It.V. of at least 0.70 dL/g without solid state polymerizing the polymer, said polymer comprising antimony residues and having a b* color of −5 to +5 and an L* of at least 70. The polymer is desirably substantially free of titanium residues.

DETAILED DESCRIPTION OF THE INVENTION

The present invention may be understood more readily by reference to the following detailed description of the invention.

It must also be noted that, as used in the specification and the appended claims, the singular forms "a," "an" and "the" include plural referents unless the context clearly dictates otherwise. For example, reference to processing or making a "polymer," a "preform," "article," "container," or "bottle" is intended to include the processing or making of a plurality of polymers, preforms, articles, containers or bottles. References to a composition containing "an" ingredient or "a" polymer is intended to include other ingredients or other polymers, respectively, in addition to the one named.

By "comprising" or "containing" is meant that at least the named compound, element, particle, or method step etc. must be present in the composition or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence. Expressing a range includes all integers and fractions thereof within the range. Expressing a temperature or a temperature range in a process, or of a reaction mixture, or of a melt or applied to a melt, or of a polymer or applied to a polymer means in all cases that the reaction conditions are set to the specified temperature or any temperature, continuously or intermittently, within the range; and that the reaction mixture, melt or polymer are subjected to the specified temperature.

The intrinsic viscosity values described throughout this description are set forth in dL/g units as calculated from the inherent viscosity measured at 25° C. in 60/40 wt/wt phenol/tetrachloroethane according to the calculations immediately prior to Example 1 below.

Any compound or element added to the "melt phase" includes the addition of the compound or element as a feed at any point in the process and up to the stage when the melt is solidified, whether or not a melt actually exists at the addition point. Examples of addition points to a melt phase include to an esterification reactor, within a series a esterification reactors, to an oligomeric reaction mixture, before polycondensation and after conclusion of esterification, during prepolymerization, or to the finisher.

A "base polyester polymer" is a polyester polymer obtained from the melt phase reaction and is made without the addition of bluing toners, without AA reducing additives, and without stabilizers. The base polyester polymer, however, may be made with additives which reduce a metal catalyst compound to elemental metal.

A "melt phase product" is a polyester polymer obtained from a melt phase reaction made with or without the addition of bluing toners and other toners, AA reducing additives, or reheat rate enhancing additives. The polyester polymer melt phase product may also contain stabilizers. The additives and toners may be added neat, in a carrier, or in a concentrate to the melt phase. The melt phase products may be isolated in the form of pellets or chips, or may be fed as a melt directly from the melt phase finishers into extruders and directed into molds for making shaped articles such as bottle preforms (e.g. "melt to mold" or "melt to preform"). Unless otherwise specified, the melt phase product may take any shape or form, including amorphous pellets, crystallized pellets, solid stated pellets, preforms, sheets, bottles, and so forth. The molecular weight of the melt phase products may optionally be increased in the solid state before melt extruding and shaping into an article.

A "polyester polymer composition" contains at least melt phase products, may optionally contain other ingredients one desires to add which are not already contained in the melt phase products, and is considered the fully formulated composition which is used to make the shaped articles. For example, the bluing toners, AA reducing additives, or reheat additives, if not already added to the melt phase for making the melt phase product, can be added to a melt phase product as a solid/solid blend or a melt blend, or the additives may be fed together with the melt phase products to an extruder for making shaped articles such that the polyester polymer composition is formed at or in the extruder. The additives and toners may be added neat, in a liquid carrier, or in a solid polyester concentrate.

The polyester polymer of this invention is any thermoplastic polyester polymer in any state (e.g. solid or molten), and in any shape, each as the context in which the phrase is used dictates, and includes the composition of matter resulting from the melt phase, or as a solid stated polymer, or the composition of matter in a melt extrusion zone, a bottle preform, or in a stretch blow molded bottle. The polyester polymer may optionally contain additives added to the polyester polymer melt phase product or to the solid stated pellet.

The term "melt" in the context of the melt phase reaction is a broad umbrella term referring to a stream undergoing reaction at any point in the melt phase for making a polyester polymer, and includes the stream in the esterification phase even though the viscosity of the stream at this stage is typically not measurable or meaningful, and also includes the stream in the polycondensation phase including the prepolymer and finishing phases, in-between each phase, and up to the point where the melt is solidified, and excludes a polyester polymer undergoing an increase in molecular weight in the solid state.

L*, a*, and b* color ranges are described herein and in the appended claims. The L*, a*, or b* color are measured from specimens ground to a powder or made from a disc as explained below. A specimen is considered to be within a specified L* or b* color range in the appended claims if the reported L* or b* value obtained from a specimen measured by any one of these test methods is within the ranges expressed in the appended claims. For example, a b* color value outside a specified b* range as measured by one test method but inside a specified b* range as measured by another test method is deemed to be a polymer within the specified range because it satisfied the specified b* color range by one of the test methods.

The polyester polymer composition is not so limited, e.g. the composition may be made with or without bluing toners, reheat additives, other catalysts, or any other additive. When specifying a color value, the polyester polymer composition having the color value does not have to exhibit that value in all of its shapes or forms throughout its production life from the melt phase to its manufacture into a bottle. Unless otherwise stated, a melt phase product or a polyester polymer composition having a specified color value may apply to the polyester polymer composition in the form of a melt, a polyester polymer melt phase product, a bottle preform, and a blown bottle, each of which can be subjected to any one of the test methods specified herein. The impact of the catalysts on the L* color of the melt phase product can be judged using the CIELab color standard L* values. The L* value is a measure of brightness. This value is measured in accordance with ASTM D 6290 for opaque or translucent powders (reflectance mode), and in accordance with ASTM D 1746 for discs (transmission mode). Color measurement theory and practice are discussed in greater detail in "Principles of Color Technology", pp. 25-66 by John Wiley & Sons, New York (1981) by Fred W. Billmeyer, Jr. Brightness is measured as L* in the CIE 1976 opponent-color scale, with 100% representing a perfect white object reflecting 100% at all wavelengths, or a colorless sample transmitting 100% at all wavelengths. An L* of 100 in a colorless sample in the transmittance mode would be perfectly transparent, while an L* of 0 in a colorless sample would be opaque.

The measurements of L*, a* and b* color values are conducted on specimens prepared according to any one of the following methods. Color is measured from polymer molded into discs (3 cm diameter with a thickness of in a range of 66 to 68 mils). Alternatively, color values are measured on polyester polymers ground to a powder passing a 3 mm screen. In the case of discs, a HunterLabUltraScan spectrophotometer is used to measure L*, a* and b* on three discs stacked together (in a range of approximately 198 to 204 mil thickness). A series of three, 3-cm diameter, about 65-68 mil thick clear discs are prepared from the polyester sample to be analyzed. Disc preparation is done by extruding each the polyester sample at a temperature of 278° C. and 120 rpm screw speed into a micro-injector barrel at 283-285° C. The barrel should be purged with material before attempting to mold any discs. The final discs are prepared using an injector pressure of 100 psig to the injection piston. The disc mold is maintained at a temperature range of 10-20° C. by circulation of chilled water. Alternative extrusion equipment may be used provided that the samples are melted at these temperatures and extruded at the stated rate. The HunterLabUltraScan spectrophotometer is operated using a D65 illuminant light source with a 10° observation angle and integrating sphere geometry. The color measurement is made in the total transmission (TTRAN) mode, in which both light transmitted directly through the sample and the light that is diffusely scattered is measured. Three discs are stacked together using a holder in front of the light source, with the area having the largest surface area placed perpendicular to the light source.

For ground powders, the HunterLab UltraScan XE spectrophotometer is operated using a D65 illuminant light source with a 10° observation angle and integrating sphere geometry. The HunterLab UltraScan XE spectrophotometer is zeroed, standardized, UV calibrated and verified in control. The color measurement is made in the reflectance (RSIN) mode. The polyester polymer specimens which are ground to a powder have a minimum degree of crystallinity of 15%. The powder should not be prepared from an amorphous polymer. Accordingly, it is expected that care should be taken when analyzing bottles from this method because bottles have regions of lower crystallinity. In the event that it is not possible to separate crystalline polymer from amorphous polymer, it is expected that the disc method will be better suited to evaluate the color values.

Polymer crystallinity is determined using Differential Scanning Calorimetry (DSC). The sample weight for this measurement is 10±1 mg. The specimens subjected to analysis are preferably cryogenically ground. The first heating scan is performed. The sample is heated from approximately 25° C. to 290° C. at a rate of 20° C./minute, and the absolute value of the area of the melting endotherms (one or more) minus the area of any crystallization exotherms is determined. This area corresponds to the net heat of melting and is expressed in Joules. The heat of melting of 100% crystalline PET is taken to be 119 Joules/gram, so the weight percent crystallinity of the pellet is calculated as the net heat of melting divided by 119, and then multiplied by 100. Unless otherwise stated, the initial melting point in each case is also determined using the same DSC scan.

The percent crystallinity is calculated from both of:
Low peak melting point: $T_{m1a}$
High peak melting point: $T_{m1b}$ Note that in some cases, particularly at low crystallinity, rearrangement of crystals can occur so rapidly in the DSC instrument that the true, lower melting point is not detected. The lower melting point can then be seen by increasing the temperature ramp rate of the DSC instrument and using smaller samples. A Perkin-Elmer Pyris-1 calorimeter is used for high-speed calorimetry. The specimen mass is adjusted to be inversely proportional to the scan rate. About a 1 mg sample is used at 500° C./min and about 5 mg are used at 100° C./min. Typical DSC sample pans were used. Baseline subtraction is performed to minimize the curvature in the baseline.

Alternatively, percent crystallinity is also calculated from the average gradient tube density of two to three pellets. Gradient tube density testing is performed according to ASTM D 1505, using lithium bromide in water.

The following description relates to any one of the several embodiments for making melt phase products and the processes for making the polyester polymer melt phase products. In the process for making a polyester polymer melt phase product, an antimony containing catalyst is added to the melt phase, the melt containing the antimony catalyst is polycondensed until the It.V. of the melt reaches at least 0.75 dL/g. Polyester polymer melt phase products in the form of pellets have an It.V. of at least 0.75 dL/g and contain the residues of the antimony catalyst. This It.V. is obtained without the necessity for solid state polymerization. There is also provided a process for making shaped articles from melt phase products by feeding to an extruder a polyester polymer composition comprising a melt phase products containing antimony residues and having an It.V. of at least 0.70 dL/g obtained without increasing the molecular weight of the melt phase product by solid state polymerization, melting the polyester polymer composition to produce a molten polyester polymer, and then extruding the molten polyester polymer composition through a die to form shaped articles.

In some additional embodiments, there is provided a melt phase process for making a polyester polymer melt phase product containing at least 100 ppm, and preferably up to about 500 ppm, or 450 ppm antimony based on the weight of the product comprising adding an antimony-containing catalyst to the melt phase; polycondensing a melt containing said catalyst in the melt phase; and before the It.V. of the melt reaches 0.45 dL/g, continuously polycondensing the melt either at a temperature within a range of 265° C. to 305° C. or at sub-atmospheric pressure or a combination thereof, in each case until the It.V. of the melt reaches at least 0.75 dL/g; to produce said polyester polymer melt phase product having a b* color in the range of −5 to +5.

Also as noted above, there is provided a melt phase process for making a polyester polymer melt phase product comprising:

a) esterifying or transesterifying a diol and a carboxylic acid component comprising dicarboxylic acids, dicarboxylic acid derivatives, and mixtures thereof to produce an oligomeric mixture;

b) polycondensing the oligomeric mixture to produce a polyester polymer melt having an It.V. of at least 0.75 dL/g; and c) adding an antimony compound to the melt phase before the It.V. of the polyester polymer melt reaches 0.45 dL/g; and d) optionally adding a stabilizer to the melt phase;

wherein the polyester polymer melt phase product has a b* color of −5 to +5.

Each of these embodiments is now described in more detail.

Examples of suitable polyester polymers made by the process include polyalkylene terephthalate homopolymers and copolymers modified with one or more modifiers in an amount of 40 mole % or less, preferably less than 15 mole %, most preferably less than 10 mole % (collectively referred to for brevity as "PAT") and polyalkylene naphthalate homopolymers and copolymers modified with less than 40 mole %, preferably less than 15 mole %, most preferably less than 10 mole %, of one or more modifiers (collectively referred to herein as "PAN"), and blends of PAT and PAN. Unless otherwise specified, a polymer includes both its homopolymer and copolymer variants. The preferred polyester polymer is a polyalkylene terephthalate polymer, and most preferred is polyethylene terephthalate polymer.

Typically, polyesters such as polyethylene terephthalate are made by reacting a diol such as ethylene glycol with a dicarboxylic acid as the free acid or its dimethyl ester to produce an ester monomer and/or oligomers, which are then polycondensed to produce the polyester. More than one compound containing carboxylic acid group(s) or derivative(s) thereof can be reacted during the process. All the compounds containing carboxylic acid group(s) or derivative(s) thereof that are in the product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the product refers to the portion of said compound(s) which remains in the oligomer and/or polymer chain after the condensation reaction with a compound(s) containing hydroxyl group(s). The residues of the carboxylic acid component refers to the portion of the said component which remains in the oligomer and/or polymer chain after the said component is condensed with a compound containing hydroxyl group(s).

More than one compound containing hydroxyl group(s) or derivatives thereof can become part of the polyester polymer product(s). All the compounds containing hydroxyl group(s) or derivatives thereof that become part of said product(s) comprise the hydroxyl component. The mole % of all the compounds containing hydroxyl group(s) or derivatives thereof that become part of said product(s) add up to 100. The residues of compound(s) containing hydroxyl group(s) or derivatives thereof that become part of said product refers to the portion of said compound(s) which remains in said product after said compound(s) is condensed with a compound(s) containing carboxylic acid group(s) or derivative(s) thereof and further polycondensed with polyester polymer chains of varying length. The residues of the hydroxyl component refers to the portion of the said component which remains in said product.

The mole % of the hydroxyl residues and carboxylic acid residues in the product(s) can be determined by proton NMR.

In one embodiment, the polyester polymers comprise:

(a) a carboxylic acid component comprising at least 80 mole %, or at least 90 mole %, or at least 92 mole %, or at least 96 mole %, of the residues of terephthalic acid, derivates of terephthalic acid, naphthalene-2,6-dicarboxylic acid, derivatives of naphthalene-2,6-dicarboxylic acid, or mixtures thereof, and (b) a hydroxyl component comprising at least 80 mole %, or at least 90 mole %, or at least 92 mole %, or at least 96 mole %, of the residues of ethylene glycol, based on 100 mole percent of carboxylic acid component residues and 100 mole percent of hydroxyl component residues in the polyester polymer. Preferred are the residues of terephthalic acid and their derivates.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivates of terephthalic acid and naphthalane dicarboxylic acid include $C_1$-$C_4$ dialkylterephthalates and $C_1$-$C_4$ dialkylnaphthalates, such as dimethylterephthalate and dimethylnaphthalate In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "carboxylic acid". It is also possible for tricarboxyl compounds and compounds with a higher number of carboxylic acid groups to modify the polyester.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methyl pentanediol-(1,4); 2,2,4-trimethylpentane-diol-(1,3); 2,5-diethyl hexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

The particular process for making the polyester polymer melt phase product from the melt is not limited. Polyester melt phase manufacturing processes typically include a) direct condensation of a dicarboxylic acid with the diol, optionally in the presence of esterification catalysts, in the esterification zone, followed by b) polycondensation in the prepolymer and finishing phases in the presence of a polycondensation catalyst; or a) ester exchange usually in the presence of a transesterification catalyst in the ester exchange phase, followed by b) polycondensation in the prepolymer and finishing phases in the presence of a polycondensation catalyst.

To further illustrate, in step a), a mixture of one or more dicarboxylic acids, preferably aromatic dicarboxylic acids, or ester forming derivatives thereof, and one or more diols are continuously fed to an esterification reactor operated at a temperature of between about 200° C. and 300° C., and at a super-atmospheric pressure of between about 1 psig up to about 70 psig. The residence time of the reactants typically ranges from between about one and five hours. Normally, the dicarboxylic acid is directly esterified with diol(s) at elevated pressure and at a temperature of about 240° C. to about 285° C.

The esterification reaction is continued until a degree of esterification of at least 70% is achieved, but more typically until a degree of esterification of at least 85% is achieved to make the desired oligomeric mixture (or otherwise also known as the "monomer"). The reaction to make the oligomeric mixture is typically uncatalyzed in the direct esterification process and catalyzed in ester exchange processes. The antimony containing catalyst may optionally be added in the esterification zone along with raw materials. Typical ester exchange catalysts which may be used in an ester exchange reaction between dialkylterephthalate and a diol include titanium alkoxides and dibutyl tin dilaurate, zinc compounds, manganese compounds, each used singly or in combination with each other. Any other catalyst materials well known to those skilled in the art are suitable. In a most preferred embodiment, however, the ester exchange reaction proceeds in the absence of titanium compounds. Titanium based catalysts present during the polycondensation reaction negatively impact the b* by making the melt more yellow. While it is possible to deactivate the titanium based catalyst with a stabilizer after completing the ester exchange reaction and prior to commencing polycondensation, in a most preferred embodiment it is desirable to eliminate the potential for the negative influence of the titanium based catalyst on the b* color of the melt by conducting the direct esterification or ester exchange reactions in the absence of any titanium containing compounds. Suitable alternative ester exchange catalysts include zinc compounds, manganese compounds, or mixtures thereof.

The resulting oligomeric mixture formed in the esterification zone (which includes direct esterification and ester exchange processes) includes bis(2-hydroxyethyl)terephthalate (BHET) monomer, low molecular weight oligomers, DEG, and trace amounts of water as the condensation by-product not removed in the esterification zone, along with other trace impurities from the raw materials and/or possibly formed by catalyzed side reactions, and other optionally added compounds such as toners and stabilizers. The relative amounts of BHET and oligomeric species will vary depending on whether the process is a direct esterification process in which case the amount of oligomeric species are significant and even present as the major species, or a ester exchange process in which case the relative quantity of BHET predominates over the oligomeric species. Water is removed as the esterification reaction proceeds to drive the equilibrium toward the desired products. The esterification zone typically produces the monomer and oligomer species, if any, continuously in a series of one or more reactors. Alternately, the monomer and oligomer species in the oligomeric mixture could be produced in one or more batch reactors. It is understood, however, that in a process for making PEN, the reaction mixture will contain the monomeric species bis 2,6-(2-hydroxyethyl) naphthalate and its corresponding oligomers. At this stage, the It.V. is usually not measurable or is less than 0.1. The average degree of polymerization of the molten oligomeric mixture is typically less than 15, and often less than 7.0.

Once the oligomeric mixture is made to the desired degree of esterification, it is transported from the esterification zone or reactors to the polycondensation zone in step b). The polycondensation zone is typically comprised of a prepolymer zone and a finishing zone, although it is not necessary to have split zones within a polycondensation zone. Polycondensation reactions are initiated and continued in the melt phase in a prepolymerization zone and finished in the melt phase in a finishing zone, after which the melt is solidified to form the polyester polymer melt phase product, generally in the form of chips, pellets, or any other shape.

Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. The residence time of the melt in the finishing zone relative to the residence time of the melt in the prepolymerization zone is not limited. For example, in some reactor designs, the prepolymerization zone represents the first half of polycondensation in terms of reaction time, while the finishing zone represents the second half of polycondensation. Other reactor designs may adjust the residence time between the finishing zone to the prepolymerization zone at about a 1.5:1 ratio or higher. A common distinction between the prepolymerization zone and the finishing zone in many designs is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and oligomers in the oligomeric mixture are polymerized via polycondensation to form polyethylene terephthalate polyester (or PEN polyester) in the presence of an antimony containing catalyst added to the melt phase described as step c) in the esterification or polycondensation zones, such as immediately prior to initiating polycondensation, during polycondensation, or to the esterification zone prior to initiating esterification or ester exchange or during or upon completion of the esterification or ester exchange reaction. If the antimony catalyst is not added in the monomer esterification stage for the manufacture of the oligomeric mixture, it is added at this stage to catalyze the reaction between the monomers and between the low molecular weight oligomers and between each other to build molecular weight and split off the diol(s) as a by-product. If the antimony containing catalyst is added to the esterification zone, it is typically blended with the diol(s) and fed into the esterification reactor.

If desired, the antimony containing catalyst is added to the melt phase before the It.V. of the melt exceeds 0.30 dL/g. By adding the antimony containing catalyst before the It.V. of the melt exceeds 0.30 dL/g, inordinately long reaction times are avoided. The antimony containing catalyst can be added to the esterification zone or the polycondensation zone or both. Preferably, the antimony containing catalyst is added before the It.V. of the melt exceeds 0.2 dL/g, or regardless of the actual It.V., more preferably before entering the polycondensation zone. The commencement of the polycondensation reaction is generally marked by either a higher actual operating temperature than the operating temperature in the esterification zone, or a marked reduction in pressure compared to the esterification zone, or both. In some cases, the polycondensation zone is marked by higher actual operating temperatures and lower (usually sub-atmospheric) pressures than the actual operating temperature and pressure in the esterification zone.

Suitable antimony containing catalysts added to the melt phase are any antimony containing catalysts effective to catalyze the polycondensation reaction. These include, but are not limited to, antimony (III) and antimony (V) compounds recognized in the art and in particular, diol-soluble antimony (III) and antimony (V) compounds, with antimony (III) being most commonly used. Other suitable compounds include those antimony compounds that react with, but are not necessarily soluble in the diols prior to reaction, with examples of such compounds including antimony (III) oxide. Specific examples of suitable antimony catalysts include antimony (III) oxide and antimony (III) acetate, antimony (III) glycolates, antimony (III) ethylene glycoxide and mixtures thereof, with antimony (III) oxide being preferred. The preferred amount of antimony catalyst added is that effective to provide a level of between about at least 100, or at least 180, or at least 200 ppm. The stated amount of antimony is based on the metal content, regardless of its oxidation state. For practical purposes, not more than about 500 ppm of antimony by weight of the resulting polyester is needed.

The prepolymer polycondensation stage generally employs a series of one or more vessels and is operated at a temperature of between about 230° C. and 305° C. for a period between about five minutes to four hours. During this stage, the It.V. of the monomers and oligomers are increased generally up to about no more than 0.45 dL/g. The diol byproduct is removed from the prepolymer melt generally using an applied vacuum ranging from 4 to 200 torr to drive the polycondensation of the melt. In this regard, the polymer melt is sometimes agitated to promote the escape of the diol from the polymer melt. As the polymer melt is fed into successive vessels, the molecular weight and thus the intrinsic viscosity of the polymer melt increases. The pressure of each vessel is generally decreased to allow for a greater degree of polymerization in each successive vessel or in each successive zone within a vessel. To facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to, argon, helium and nitrogen.

Once the desired It.V. in the prepolymerization zone is obtained, generally no greater than 0.45, the prepolymer is fed from the prepolymer zone to a finishing zone where the second stage of polycondensation is continued in one or more finishing vessels generally, but not necessarily, ramped up to higher temperatures than present in the prepolymerization zone, to a value within a range of from 250° C. to 310° C., more generally from 270 to 300° C., until the It.V. of the melt is increased from the It.V of the melt in the prepolymerization zone (typically 0.30 but usually not more than 0.45) to an It.V in the range of from about at least 0.70, or at least 0.75 dL/g, to about 1.2 dL/g. The final vessel, generally known in the industry as the "high polymerizer," "finisher," or "polycondenser," is also usually operated at a pressure lower than used in the prepolymerization zone to further drive off the diol and increase the molecular weight of the polymer melt. The pressure in the finishing zone may be within the range of about 0.2 and 20 torr, or 0.2 to 10 torr, or 0.2 to 2 torr. Although the finishing zone typically involves the same basic chemistry as the prepolymer zone, the fact that the size of the molecules, and thus the viscosity differs, means that the reaction conditions also differ. However, like the prepolymer reactor, each of the finishing vessel(s) is operated under vacuum or inert gas, and each is typically agitated to facilitate the removal of the diol and water.

With the process of the invention, the melt phase polycondensation reaction is capable of proceeding within a wide range of operating temperatures and catalyst concentrations while maintaining an acceptable b* color of the base polyester polymer below +5. Thus, the process of the invention is not restricted to low catalyst concentrations and low polycondensation temperatures to maintain an acceptable b* color.

It is to be understood that the process described above is illustrative of a melt phase process, and that the invention is not limited to this illustrative process. For example, while reference has been made to a variety of operating conditions at certain discrete It.V. values, differing process conditions may be implemented inside or outside of the stated It.V. values, or the stated operating conditions may be applied at It.V. points in the melt other than as stated. Moreover, one may adjust the the process conditions based on reaction time instead of measuring the It.V. of the melt. Moreover, the process is not limited to the use of tank reactors in series or parallel or to the use of different vessels for each zone. Moreover, it is not necessary to use split the polycondensation reaction into a prepolymer zone and a finishing zone because the polycondensation reaction can take place on a continuum of slight variations in operating conditions over time in one polycondensation reactor or in a multitude of reactors in series, either in a batch, semi-batch, or a continuous process.

Once the desired It.V. is obtained with a minimum It.V. of 0.70 dL/g, or a minimum It.V. of 0.75 dL/g in other embodiments, the polyester polymer melt in the melt phase reactors is discharged as a melt phase product. The melt phase product is further processed to a desired form, such as an amorphous pellet, or a shaped article via a melt to mold process. The It.V. of the melt phase product is at least 0.70 dL/g, or 0.75 dL/g, or 0.78 dL/g, or 0.80 dL/g, and up to about 1.2 dL/g, or 1.15 dL/g.

There is also provided a process for making a melt phase product by polymerizing a melt in the presence of an antimony-containing catalyst, wherein the reaction time of the melt from an It.V. of 0.45 dL/g through and up to an It.V. in the range of 0.70 dL/g to 0.90 dL/g, or through and up to completing the polycondensation reaction, is 100 minutes or less, or 80 minutes or less, or 70 minutes or less. In another embodiment, the reaction time of the melt from an It.V. of 0.3 dL/g through and up to an It.V. in the range of 0.70 dL/g to 0.90 dL/g is 100 minutes or less, or 80 minutes or less, or 70 minutes or less. Alternatively, the reaction time in the finishing zone to complete the polycondensation is 100 minutes or less, or 80 minutes or less, regardless of the It.V. of the melt fed to the finishing zone. Preferably, the pressure applied within this range is about 2 mm Hg or less, and about 0.05 mm Hg or more. Moreover, the b* color of the melt phase product produced by this process is within the range of −5 to +5. The process of the invention permits one to rapidly make a base polyester polymer having an acceptable b* color.

There is also provided an embodiment comprising feeding to an extruder, such as an injection molding machine, a a polyester polymer composition comprising a melt phase product containing antimony residues and having an It.V. of at least 0.70 dL/g obtained without increasing the molecular weight of the melt phase product in the solid state, melting the polyester polymer composition to produce a molten polyester polymer, extruding the molten polyester polymer composition through a die to form shaped articles, wherein the shaped articles have a b* color ranging from −5 to +5. By making the high It.V. product in the melt phase, the solid stating step can be altogether avoided. Solid stating is commonly used for increasing the molecular weight (and the It.V) of the pellets in the solid state, usually by at least 0.05 It.V. units, and more typically from 0.1 to 0.5 It.V. units.

While the production of the polyester polymer melt phase product having a high It.V. of at least 0.75 dL/g avoids the need for solid stating, in an optional embodiment, the melt phase products may be solid stated if desired to further increase their molecular weight.

In yet another embodiment, there is also provided a polyester polymer composition comprising melt phase products having a degree of crystallinity of at least 25%, an It.V. of at least 0.70 dL/g without solid state polymerization, and antimony containing residues, said polyester polymer composition having a b* color of −5 to +5, and an L* of at least 70. The degree of crystallinity is measured by the technique described above. The degree of crystallinity is optionally at least 30%, or at least 35%, or at least 40%. The melt phase products are preferably substantially free of titanium residues, and in a direct esterification process, are preferably prepared by adding to the melt phase a polycondensation catalyst consisting only of antimony containing compound(s). Thus, polyester polymers made rapidly in the melt phase having acceptable color can now be isolated as bright, crystallized pellets and provided to a converter without the need for increasing their molecular weight in the solid state.

In yet another embodiment, there is also provided a polyester polymer composition substantially free of titanium residues comprising a polyester polymer having a b* color of −5 to +5 CIELAB units, an L* of at least 70 CIELAB units, and an It.V. of at least 0.75 dL/g obtained without subjecting the polymer to an increase in its molecular weight through solid stating, and containing antimony residues. These compositions may contain at least 4 ppm of a reheat additive, a stabilizer, a bluing toner, and/or acetaldehyde scavenging additive.

If desired, the thermal stability of the polyester polymer can be increased and the tendency of the molded article to form haze can be decreased by adding a suitable stabilizer to the melt described as step d). Not every formulation requires the addition of a stabilizer, and not every end use application requires exceptionally high brightness. Suitable stabilizer compounds, if used, contain one or more phosphorus atoms.

The phosphorus containing stabilizer compounds may be added at any point in the melt phase process. For example, the catalyst stabilizer can be added at any point in the melt phase process, including as a feed to the esterification zone, during esterification, to the oligomeric mixture, to the beginning of polycondensation, and during or after polycondensation. The stabilizer is desirably added after the addition of the antimony containing catalyst and before pelletization, such as before the prepolymer zone, to the prepolymer zone, to the finisher, or between the finishing zone and a pelletizer.

In an ester exchange reaction, the catalyst stabilizer or other compounds effective for deactivating ester exchange catalysts can be additionally be added at the conclusion of the ester exchange reaction and before polycondensation in molar amounts sufficient to deactivate the ester exchange catalyst without significantly impairing the catalytic activity of the antimony containing catalyst added after deactivating the ester exchange catalyst. However, the ester exchange catalyst does not have to deactivated prior to adding the antimony containing catalyst if the ester exchange catalyst does not unduly impair the color of the resulting polyester polymer melt phase product. Titanium containing catalysts, however, have to be deactivated before the start of polycondensation, and preferably are not added to the ester exchange zone, esterification zone or polycondensation zones at all since they have been found to unduly impair the b* color. In the case of direct esterification, and in the absence of any titanium-containing compounds, stabilizers, if added, can be added after the desired It.V. is obtained.

Specific examples of stabilizers include acidic phosphorus compounds such as phosphoric acid, phosphorous acid, polyphosphoric acid, carboxyphosphonic acids, phosphonic acid derivatives, and each of their acidic salts and acidic esters and derivatives, including acidic phosphate esters such as phosphate mono- and di-esters and non acidic phosphate esters (e.g. phosphate tri-esters) such as trimethyl phosphate, triethyl phosphate, tributyl phosphate, tributoxyethyl phosphate, tris(2-ethylhexyl) phosphate, oligomeric phosphate tri-esters, trioctyl phosphate, triphenyl phosphate, tritolyl phosphate, (tris)ethylene glycol phosphate, triethyl phosphonoacetate, dimethyl methyl phosphonate, tetraisopropyl methylenediphosphonate, mixtures of mono-, di-, and tri-esters of phosphoric acid with ethylene glycol, diethylene glycol, and 2-ethylhexanol, or mixtures of each. Other examples include distearylpentaerythritol diphosphite, mono-, di-, and trihydrogen phosphate compounds, phosphite compounds, certain inorganic phosphorus compounds such as monosodium phosphate, zinc or calcium phosphates, poly(ethylene)hydrogen phosphate, silyl phosphates; phosphorus compounds used in combinations with hydroxy- or amino-substituted carboxylic acids such as methyl salicylate, maleic acid, glycine, or dibutyl tartrate; each useful for inactivating metal catalyst residues.

The quantity of phosphorus relative to the antimony atoms used in this process is not limited, but consideration is taken for the amount of antimony metal and other metals present in the melt. The molar ratio of phosphorus to antimony is desirably at least 0.025:1, or in the range of 0.025:1 to 5.0:1, preferably about 0.1:1 to 3.0:1.

To the melt or to the melt phase products may also be added an acetaldehyde bonding or scavenging compound. The particular point of addition will depend somewhat on the type of AA lowering compound used. The AA scavenging compound may be fed to an extruder used as part of the melt processing of pellets into preforms or other shaped articles, or the AA scavenging compound may be added to the melt in the melt phase process. Some scavengers have a finite number of reaction sites. If AA scavengers are added to the melt-phase, often all the reactive sites have been used up by the time the polyester polymer pellets are melted to make preforms. Other AA scavengers are not stable at the temperatures and times involved in polycondensation. If the AA scavenging agent contains sufficient reaction sites and the material and its product are thermally stable, they may be added to the melt in the melt phase process for making the polyester polymer, such as in the finishing section where the It.V. will exceed 0.45 dL/g, and more preferably after the finishing section and before pelletization where the It.V. will exceed 0.70 dL/g.

The addition of AA scavenging additives is optional and not every application requires the presence of this additive. However, if used, the AA scavenging additive is generally added in an amount between about 0.05 and 5 weight %, more preferably between about 0.1 and 3 weight % based on the weight of the polyester polymer melt phase product. It should be understood that the additive may be added individually or in a liquid carrier or as a solid concentrate in a compatible polymer base resin. The AA scavenging additive may be present in a concentrate in an amount ranging from 0.5 wt. % to 40 wt. % and let down into a bulk polyester polymer melt at the injection molding machine or to the melt in the melt phase process for making the polyester polymer, such as in the finishing section where the It.V. will exceed 0.45 dL/g and more preferably after the finishing section where the It.V. will exceed 0.70 dL/g.

The AA scavenging additive may be any additive known to react with AA. Suitable additives include polyamides such as those disclosed in U.S. Pat. Nos. 5,266,413, 5,258,233 and 4,8837,115; polyesteramides such as those disclosed in U.S. application Ser. No. 595,460, filed Feb. 5, 1996; nylon-6 and other aliphatic polyamides such as those disclosed in Japan Patent Application Sho 62-182065 (1987); ethylenediaminetetraacetic acid (U.S. Pat. No. 4,357,461), alkoxylated polyols (U.S. Pat. No. 5,250,333), bis(4-[bgr]-hydroxyethoxyphenyl) sulfone (U.S. Pat. No. 4,330,661), zeolite compounds (U.S. Pat. No. 5,104,965), 5-hydroxyisophthalic acid (U.S. Pat. No. 4,093,593), supercritical carbon dioxide (U.S. Pat. No. 5,049,647 and U.S. Pat. No. 4,764,323) and protonic acid catalysts (U.S. Pat. No. 4,447,595 and U.S. Pat. No. 4,424,337). Preferably the AA lowering additive is selected from polyamides and polyesteramides. Suitable polyamides include homo and copolyamides such as poly (caprolactam), poly(hexamethylene-adipamide), poly(m-xylylene-adipamide), etc. Branched or hyperbranched polyamides can also be used.

Suitable poyesteramides include the polyesteramides prepared from terephthalic acid, 1,4-cyclohexane-dimethanol, isophthalic acid and hexamethylene diamine (preferably with about 50:50 ratio of the diacids to the diamine and a 50:50 ratio of the glycol to the diamine); the polyesteramide prepared from terephthalic acid, 1,4-cyclohexanedimethanol, adipic acid and hexamethylene diamine; the polyesteramides prepared from terephthalic acid, 1,4-cylcohexanedimethanol and bis(p-amino-cylcohexyl)methane. Other known scavengers such as polyethyleneimine may also be used.

Preferred AA reducing agents are polyamide polymers selected from the group consisting of low molecular weight partially aromatic polyamides having a number average molecular weight of less than 15,000, low molecular weight aliphatic polyamides having a number average molecular weight of less than 7,000, and combinations thereof. Specific polymers within these preferred molecular weight ranges include poly(m-xylylene adipamide), poly(hexamethylene isophthalamide), poly(hexamethylene adipamide-co-isophthalamide), poly(hexamethylene adipamide-co-terephthalamide), and poly(hexamethylene isophthalamide-co-terephthalamide), poly(hexamethylene adipamide) and poly (caprolactam).

Other AA reducing agents include anthranilamides such as 2-aminobenzamide or the like as mentioned in U.S. Pat. No. 6,274,212, incorporated herein by reference. Any conventional AA reducing agent may be used.

In addition, certain agents which colorize the polymer can be added to the melt. In one embodiment, a bluing toner is added to the melt in order to reduce the b* of the resulting polyester polymer melt phase product. Such bluing agents include blue inorganic and organic toners. In addition, red toners can also be used to adjust the a* color. Organic toners, e.g., blue and red organic toners, such as those toners described in U.S. Pat. Nos. 5,372,864 and 5,384,377, which are incorporated by reference in their entirety, can be used. The organic toners can be fed as a premix composition. The premix composition may be a neat blend of the red and blue compounds or the composition may be pre-dissolved or slurried in one of the polyester's monomeric species, e.g., ethylene glycol.

Alternatively, or in addition to, inorganic bluing agents can also be added to the melt to reduce its yellow hue. Cobalt (II) compounds, such as cobalt (II) carboxylates, are one of the most widely used toners in the industry to mask the yellow color of polymers. When direct esterification is not being used, the cobalt carboxylate can be added to the ester exchange reactor to also act as an ester exchange catalyst.

The total amount of toner components added depends, of course, on the amount of inherent yellow color in the base polyester and the efficacy of the toner. Generally, a concentration of up to about 15 ppm of combined organic toner components and a minimum concentration of about 0.5 ppm are used. The total amount of bluing additive typically ranges from 0.5 to 10 ppm.

The toners can be added to the esterification zone or to the polycondensation zone. Preferably, the toners are added to esterification zone or to the early stages of the polycondensation zone, such as to a prepolymerization reactor.

The process of the invention has the advantage of producing a base polyester polymer melt phase product having both a high It.V. and a low b* rating. The b* color of the polyester polymer melt phase product is within the range of −5 to +5 CIELAB units, preferably between −5 and 4, or between −5 and 3. These values are obtainable by the process of the invention with and without the presence of bluing toners added in the melt phase or added to the product. When the base polyester polymer has a low b* rating, a bluing toner is either not required or a smaller concentration of bluing toners is needed to drive the color of the polyester polymer melt phase product closer to a neutral b* of 0. Depending on the nature of the bluing toner and other ingredients in the polyester polymer composition, the addition of less bluing toner has a further advantage of minimizing the impact on the L* brightness of the polyester polymer. While toners are optional and can be added to the melt if desired, by using an antimony-containing catalyst to catalyze the polycondensation reaction, the base polyester polymer has the capability of remaining within a b* rating of −5 to +5 without the need to add toners.

Accordingly, in another embodiment, the high It.V. polyester polymer melt phase product and the polyester polymer compositions of the invention have a b* color between −5 to +5 CIELAB units without the addition of bluing toners. In an alternative embodiment, the high It.V. polyester polymer melt phase product, and the polyester polymer compositions, of the invention not only have a b* color between −5 to +5 CIELAB units, but also have a L* brightness value of 70 CIELAB units or more, or 74 or more, or 76 or more, with and without the presence of bluing toners or residues thereof or reheat additives. In carbonated soft drink bottle applications, the melt phase product may contain bluing toners and an additive to reduce the antimony compound to form Sb metal in situ to aid the reheat rate.

Since coloring agents may be added if desired, there are also provided embodiments wherein the polyester polymer melt phase product has an It.V. of at least 0.75 dL/g, a b* color between −5 to +5 CIELAB units, an L* brightness value of 70 CIELAB units or more, and contains a bluing toner or residue thereof. In a further embodiment, there is provided a polyester polymer composition comprising a melt phase product made in the melt phase to an It.V. of at least 0.70 dL/g, a bluing toner or residue thereof and/or a red toner or residue thereof, and a reheat additive, wherein the composition has a b* color between −5 to +5 CIELAB units and a L* brightness value of 70 CIELAB units or more, more preferably 74 CIELAB units or more. In a preferred aspect to both of these embodiments, the bluing toner is an organic toner, and the polyester polymer composition is devoid of cobalt compounds added to the esterification reactor. Minor amounts of certain cobalt compounds may be present with the diacid and/or diol starting materials. Although cobalt compounds mask the yellow color of some polyester polymers, they also may, impart a gray color to the polymer at high levels and/or lower the resulting polymer's thermal stability in PET polymers if insufficient amounts of phosphorus compounds are present to bind to cobalt.

For processes conducted entirely in the melt-phase, high It.V. polyester polymer melt phase products catalyzed with antimony compounds tend to be darker than high It.V. titanium compound catalyzed polyester polymers without the addition of any reheat additive, toners, or AA lowering additives. However, some of the antimony in the $Sb^{+3}$ oxidation state may be reduced to the $Sb^0$ oxidation state merely at reaction temperatures and times without the presence of added reducing compounds. The $Sb^0$ metal present in the polymer has the advantage of also acting as a reheat aid to increase the rate at which bottle preforms reheat prior to blow molding. A reducing compound can be added to the polycondensation reaction to produce even more $Sb^0$ in situ. Examples of reducing compounds include phosphorous acid, alkyl or aryl phosphonic acids, and alkyl or aryl phosphites. Reduced antimony often delivers equivalent reheat increases with less reduction in the brightness of the polymer than is the case for other added reheat additives such as black iron oxide and carbon black.

Examples of other reheat additives (a reheat additive is deemed a compound added to the melt in contrast to forming a reheat aid in situ) used in combination with reduced antimony formed in situ or as an alternative to reduced antimony formed in situ include activated carbon, carbon black, antimony metal, tin, copper, silver, gold, palladium, platinum, black iron oxide, and the like, as well as near infrared absorbing dyes, including, but not limited to those disclosed in U.S. Pat. No. 6,197,851 which is incorporated herein by reference.

The iron oxide, which is preferably black, is used in very finely divided form, e.g., from about 0.01 to about 200 μm, preferably from about 0.1 to about 10.0 μm, and most preferably from about 0.2 to about 5.0 μm. Suitable forms of black iron oxide include, but are not limited to magnetite and maghemite. Red iron oxide may also be used. Such oxides are described, for example, on pages 323-349 of Pigment Handbook, Vol. 1, copyright 1973, John Wiley & Sons, Inc.

Other components can be added to the composition of the present invention to enhance the performance properties of the polyester polymer. For example, crystallization aids, impact modifiers, surface lubricants, denesting agents, antioxidants, ultraviolet light absorbing agents, metal stabilizers, colorants, nucleating agents, acetaldehyde bonding compounds, other reheat rate enhancing aids, sticky bottle additives such as talc, and fillers and the like can be included.

The compositions of the present invention optionally may additionally contain one or more UV absorbing compounds. One example includes UV absorbing compounds which are covalently bound to the polyester molecule as either a comonomer, a side group, or an end group. Suitable UV absorbing compounds are thermally stable at polyester processing temperatures, absorb in the range of from about 320 nm to about 380 nm, and are difficult to extract or nonextractable from said polymer. The UV absorbing compounds preferably provide less than about 20%, more preferably less than about 10%, transmittance of UV light having a wavelength of 370 nm through a bottle wall 12 mils (305 microns) thick. Suitable chemically reactive UV absorbing compounds include substituted methine compounds of the formula

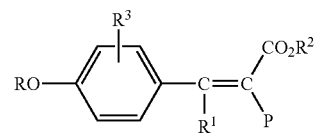

wherein:

R is hydrogen, alkyl, substituted alkyl, aryl, substituted aryl, cycloalkyl, substituted cycloalkyl or alkenyl, or a polyoxyalkylene chain, such as polyoxyethylene or polyoxypropylene polymers, each optionally having some oxypropylene or oxyethylene units in the polymer chain as a block or random copolymer, the polyoxyalkylene chain having a number average molecular weight ranging from 500 to 10,000;

$R^1$ is hydrogen, or a group such as alkyl, aryl, or cycloalkyl, all of which groups may be substituted;

$R^2$ is any radical which does not interfere with condensation with the polyester, such as hydrogen, alkyl, substituted alkyl, allyl, cycloalkyl or aryl;

$R^3$ is hydrogen or 1-3 substitutents selected from alkyl, substituted alkyl, alkoxy, substituted alkoxy and halogen, and P is cyano, or a group such as carbamyl, aryl, alkylsulfonyl, arylsufonyl, heterocyclic, alkanoyl, or aroyl, all of which groups may be substituted.

Preferred methine compounds are those of the above formula wherein: $R^2$ is hydrogen, alkyl, aralkyl, cycloalkyl, cyanoalkyl, alkoxyalkyl, hydroxyalkyl or aryl; R is selected from hydrogen; cycloalkyl; cycloalkyl substituted with one or two of alkyl, alkoxy or halogen; phenyl; phenyl substituted with 1-3 substitutents selected from alkyl, alkoxy, halogen, alkanoylamino, or cyano; straight or branched lower alkenyl; straight or branched alkyl and such alkyl substituted with 1-3 substitutents selected from the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsufamoyl; vinyl-sulfonyl; acrylamido; sulfamyl; benzoylsulfonicimido; alkylsulfonamido; phenylsulfonamido; alkenylcarbonylamino; groups of the formula

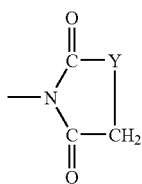

where Y is —NH—, —N-alkyl, —O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, or cyano, pyridyl, pyrimidinyl, benzoxazolyl, benzimidazolyl, benzothiazolyl; or groups of the formulae

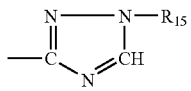

—NHXR$_{16}$, —CONR$_{15}$R$_{15}$, and —SO$_2$NR$_{15}$R$_{15}$;

wherein R$_{15}$ is selected from H, aryl, alkyl, and alkyl substituted with halogen, phenoxy, aryl, —CN, cycloalkyl, alkylsulfonyl, alkylthio, or alkoxy; X is —CO—, —COO—, or —SO$_2$—, and R$_{16}$ is selected from alkyl and alkyl substituted with halogen, phenoxy, aryl, cyano, cycloalkyl, alkylsulfonyl, alkylthio, and alkoxy; and when X is —CO—, R$_{16}$ also can be hydrogen, amino, alkenyl, alkylamino, dialkylamino, arylamino, aryl, or furyl; alkoxy; alkoxy substituted with cyano or alkoxy; phenoxy; or phenoxy substituted with 1-3 substitutents selected from alkyl, alkoxy, or halogen substituents; and P is cyano, carbamyl, N-alkylcarbamyl, N-alkyl-N-aryl-carbamyl, N,N-dialkylcarbamyl, N,N-alkylarylcarbamyl, N-arylcarbamyl, N-cyclohexyl-carbamyl, aryl, 2-benzoxazolyl, 2-benzothiazolyl, 2-benzimidazolyl, 1,3,4-thiadiazol-2-yl, 1,3,4-oxadiazol-2-yl, alkylsulfonyl, arylsulfonyl or acyl.

In all of the above definitions the alkyl or divalent aliphatic moieties or portions of the various groups contain from 1-10 carbons, preferably 1-6 carbons, straight or branched chain. Preferred UV absorbing compounds include those where R and $R^1$ are hydrogen, $R^3$ is hydrogen or alkoxy, $R^2$ is alkyl or a substituted alkyl, and P is cyano. In this embodiment, a preferred class of substituted alkyl is hydroxy substituted alkyl. A most preferred polyester composition comprises from about 10 to about 700 ppm of the reaction residue of the compound

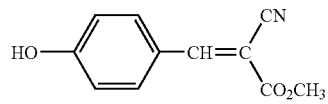

These compounds, their methods of manufacture and incorporation into polyesters are further disclosed in U.S. Pat. No. 4,617,374 the disclosure of which is incorporated herein by reference. The UV absorbing compound(s) may be present in amounts between about 1 to about 5,000 ppm by weight, preferably from about 2 ppm to about 1,500 ppm, and more preferably between about 10 and about 500 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like.

The polyester compositions of the present invention are suitable for making into chips or pellets or into a variety of shaped articles. Suitable processes for forming said articles are known and include extrusion, extrusion blow molding, melt casting, injection molding, melt to mold process, melt to pellet without solid stating, stretch blow molding (SBM), thermoforming, and the like. There is also provided a polyester polymer composition in the form of a pellet, a bottle preform, a stretch blow molded bottle, a flake, or a chip, wherein the polyester polymer composition in its particular form or shape has a b* color between −5 to +5 CIELAB units and a L* brightness of at least 70 CIELAB units in which the melt to make the polyester polymer melt phase product of the composition is reacted and formulated according to the process of the invention.

The articles can be formed from the melt phase products by any conventional techniques known to those of skill. For example, melt phase products, optionally solid state polymerized, which are crystallized to a degree of crystallization of at least 25%, are transported to a machine for melt extruding and injection molding the melt into shapes such as preforms suitable for stretch blow molding into beverage or food containers, or rather than injection molding, merely extruding into other forms such as sheet. The process for making these articles comprises:

e) drying pellets comprising melt phase products having a degree of crystallinity of at least 25% and an It.V. of at least 0.7 dL/g and antimony containing residues, optionally but preferably substantially free of titanium containing residues, in a drying zone at a zone temperature of at least 140° C.;

f) introducing the pellets into an extrusion zone and forming a molten polyester polymer composition; and g) forming a sheet, strand, fiber, or a molded part directly or indirectly from the extruded molten polyester polymer having a b* ranging from −5 to +5 and an L* of at least 70.

It is preferred that these pellets have not been subjected to a solid state polymerization step for increasing their molecular weight. In this preferred embodiment, the pellets which are prepared for introduction into an extruder are not solid stated, yet have an It.V. sufficiently high such that the physical properties are suitable for the manufacture of bottle preforms and trays.

Dryers feeding melt extruders are needed to reduce the moisture content of pellets. Moisture in or on pellets fed into a melt extrusion chamber will cause the melt to lose It.V. at melt temperatures by hydrolyzing the ester linkages with a resulting change in the melt flow characteristics of the polymer and stretch ratio of the preform when blown into bottles. It is desirable to dry the pellets at high temperatures to decrease the residence time of the pellets in the dryer and increase throughput. Drying may be conducted at 140° C. or more, meaning that the temperature of the heating medium (such as a flow of nitrogen gas or air) is 140° C. or more. The use of nitrogen gas is preferred if drying is conducted above 180° C. to avoid oxidative thermal degradation. In general, the residence time of pellets in the dryer at 140° C. or more will on average be from 0.5 hours to 16 hours. Any conventional dryer can be used. The pellets may be contacted with a countercurrent flow of heated air or inert gas such as nitrogen to raise the temperature of the pellets and remove volatiles from inside the pellets, and may also be agitated by a rotary mixing blade or paddle. The flow rate of the heating gas, if used, is a balance between energy consumption, residence time of pellets, and preferably avoiding the fluidization of the pellets. Suitable gas flow rates range from 0.05 to 100 cfm for every pound per hour of pellets discharged from the dryer, preferably from 0.2 to 5 cfm per lb. of pellets.

Once the pellets have been dried, they are introduced into an extrusion zone to form a molten polyester polymer composition, followed by extruding the molten polymer into a sheet or film or forming a molded part, such as a bottle preform through injecting the melt into a mold. Methods for the introduction of the dried pellets into the extrusion zone, for melt extruding, injection molding, and sheet extrusion are conventional and known to those of skill in the manufacture of such containers.

At the melt extruder, other components can be added to the extruder to enhance the performance properties of the pellets. These components may be added neat to the bulk polyester pellets or in a liquid carrier or can be added to the bulk polyester pellets as a solid polyester concentrate containing at least about 0.5 wt. % of the component in the polyester polymer let down into the bulk polyester. The types of suitable components include crystallization aids, impact modifiers, surface lubricants, stabilizers, denesting agents, compounds, antioxidants, ultraviolet light absorbing agents, metal deactivators, colorants, nucleating agents, acetaldehyde lowering compounds, reheat rate enhancing aids, sticky bottle additives such as talc, and fillers and the like can be included. All of these additives and many others and their use are well known in the art and do not require extensive discussion.

While an embodiment has been described for the drying of pellets which have not been solid stated, it is also contemplated that pellets which have optionally been solid stated are also dried at temperatures of 140° C. or more. Examples of the kinds of shaped articles which can be formed from the the melt phase products and the polyester polymer composition of the invention include sheet; film; packaging and containers such as preforms, bottles, jars, and trays; rods; tubes; lids; and filaments and fibers. Beverage bottles made from polyethylene terephthalate suitable for holding water or carbonated beverages, and heat set beverage bottle suitable for holding beverages which are hot filled into the bottle are examples of the types of bottles which are made from the crystallized pellet of the invention. Examples of trays are those which are dual ovenable and other CPET trays.

This invention can be further illustrated by the additional examples of embodiments thereof, although it will be understood that these examples are included merely for purposes of illustration and are not intended to limit the scope of the invention.

EXAMPLES

The following apply to all the examples and comparative examples. The starting oligomeric mixture employed in the polycondensations throughout all the examples, unless otherwise noted, was prepared from terephthalic acid, ethylene glycol, about 1.5 mole percent of about 35% cis/65% trans 1,4-cyclohexanedimethanol, and about 1.2-1.3 weight percent of diethylene glycol generated during esterification. The conversion of acid groups was about 95% by NMR/titration carboxyl ends groups. The $M_n$ of the oligomeric mixture was about 766 g/mole, and the $M_w$ was about 1478 g/mole.

All of the high IV polyesters in the examples were made exclusively in the melt phase, i.e., the molecular weight of the polyester polymer melt phase products as indicated by their Ih.V. were not increased in the solid state.

In the titanium catalyzed samples, the following test procedure was used. For polycondensation, the ground oligomer (103 g) is weighed into a half-liter, single-necked, round-bottomed flask. The catalyst solution added to the flask is titanium tetrabutoxide in n-butanol. A 316 L stainless steel paddle stirrer and glass polymer head were attached to the flask. After attaching the polymer head to a side arm and a purge hose, two nitrogen purges are completed. The polymerization reactor is operated under control of a CAMILE™ automation system, programmed to implement the following array.

| Stage | Time (min.) | Temp. C. ° | Vacuum (torr) | Stir Speed (rpm) |
|---|---|---|---|---|
| 1 | 0.1 | 270 | 730 | 0 |
| 2 | 10 | 270 | 730 | 150* |
| 3 | 2 | 270 | 140 | 300* |
| 4 | 1 | 270 | 140 | 300 |
| 5 | 10 | 270 | 25* | 300 |
| 6 | 10 | 270 | 25 | 300 |
| 7 | 1 | 270 | 140* | 300 |
| 8 | 2 | 270 | 140 | 300 |
| 9 | 1 | 270 | 25* | 300 |
| 10 | 10 | 270 | 25 | 300 |
| 11 | 2 | 270 | 2* | 30* |
| 12 | 1 | 270 | 0.5* | 30 |
| 13 | 500# | 270 | 0.5 | 30 |

*= ramp;
= torque termination
when temperature = 300° C., change all 270 to 300 (for 285° C., change all 270 to 285).

A molten bath of Belmont metal is raised to surround the flask, and the CAMILE™ array is implemented. In this array, a "ramp" is defined as a linear change of vacuum, temperature, or stir speed during the specified stage time. The stirring system is automatically calibrated between stages 4 and 5. After stage 6 ends, the vacuum level was ramped up to 140 torr, and then a 2 minute additive addition stage (stage 8) begins. The finisher stage (13) is terminated according to the stirrer torque. The polymer is cooled to ambient temperature. The polymers are chopped and ground to pass a 3 mm screen.

The same procedure as set forth above is used to make samples of antimony catalyzed melt phase products. The experiment varies the antimony level (Sb), vacuum level and temperature. The polymers are made as described in the previous example except that the catalyst solution added to the flask is antimony triacetate in ethylene glycol.

The temperature of polycondensation designated in Table 1 is used throughout the entire sequence, i.e., the temperature in the prepolymer stages and the temperature in the finisher stage are the same. The target Ih.V. is 0.80 dL/g+/−0.05 (corresponding to a calculated It.V. of about 0.84 dL/g) An agitator torque target is identified for each finisher temperature and each polymerization rig. As the molecular weight and corresponding Ih.V. of the melt increases, its melt viscosity also increases which is correlated to the torque required by the agitator to turn a revolution. Each run is terminated when the torque target on the agitator is achieved three times.

The comparative titanium catalyzed examples are indicated by the letter C following the sample number. The results set forth in Table 1 illustrate the effect of antimony and titanium based catalysts, respectively, on the b* and L* colors.

The intrinsic viscosity values reported are the limiting value at infinite dilution of the specific viscosity of a polymer. The intrinsic viscosity is defined by the following equation:

The intrinsic viscosity (ItV or $\eta_{int}$) may be estimated using the Billmeyer equation as follows:

$$\eta_{int}=0.5\ [e^{0.5 \times Corrected\ IhV}-1]+(0.75 \times Corrected\ IhV)$$

All of the color results shown in this example are the color of the base polyester polymer, i.e., no blue or red toners or other toners were added, and no stabilizers, reheat additives, acetaldehyde bonding agents, or agents to reduce the antimony compound to antimony metal were added to the melt phase. For each of these examples using antimony catalysts, however, some $Sb^0$ metal was generated in situ solely by virtue of the process temperature and time.

The L*, a* and b* color measurement were obtained according to the test methods and process described above by grinding the polymer into powder according to the method described further above. Crystallinity was imparted to each polymer upon cooling the polymer from the melt phase during solidification. Some of the polymers were analyzed for their degree of crystallinity. Each of the polymers are believed to have a degree of crystallinity about or above 25%. The analytical method used to determine the degree of crystallinity is the DSC method described further above. The results are reported in Table 1.

TABLE 1

| Sample No. | Ti Level In ppm target (actual) | Sb Level In ppm target (actual) | Temp (deg C.) | Vacuum (torr) | Torque Target (kg * cm) | Time to IhV (min) | IhV (dL/g) | L* powder | b* powder | % Crystalinity |
|---|---|---|---|---|---|---|---|---|---|---|
| 1C | 5 (5.3) | | 270 | 2 | 6.6 | 223.2 | 0.781 | 81.13 | 10.58 | 34.3 |
| 2C | 5 (4.9) | | 270 | 0.2 | 6.1 | 123.6 | 0.795 | 78.59 | 8.65 | |
| 3 | | 400 (393) | 270 | 0.2 | 6.6 | 105.4 | 0.833 | 73.27 | 3.76 | |
| 4 | | 250 (242) | 285 | 1.1 | 5.46 | 105.1 | 0.8 | 75.46 | 4.43 | |
| 5 | | 250 (247) | 285 | 1.1 | 5.46 | 84.6 | 0.812 | 78.74 | 3.99 | 39.3 |
| 6 | | 250 (246) | 285 | 1.1 | 5.46 | 82.9 | 0.766 | 77.40 | 5.62 | |
| 7 | | 250 (246) | 285 | 1.1 | 6.05 | 81.5 | 0.768 | 75.29 | 4.90 | |
| 8 | | 250 (250) | 285 | 1.1 | 6.05 | 75.0 | 0.773 | 82.05 | 6.10 | |
| 9 | | 250 (243) | 285 | 1.1 | 6.05 | 60.0 | 0.728 | 78.25 | 4.84 | 42 |
| 10 | | 100 (102) | 290 | 2 | 4.9 | 146.8 | 0.793 | 80.34 | 8.55 | |
| 11C | 5 (5) | | 300 | 2 | 4.857 | 54.8 | 0.83 | 81.73 | 13.04 | 33.5 |
| 12C | 5 (5.1) | | 300 | 0.2 | 5.05 | 30.1 | 0.805 | 82.32 | 10.55 | |
| 13 | | 400 (379) | 300 | 2 | 5.05 | 46.4 | 0.812 | 70.23 | 3.11 | 37.2 |
| 14 | | 400 (380) | 300 | 0.2 | 4.857 | 20.3 | 0.768 | 73.81 | 3.83 | |
| 15C | 15 (14.9) | | 270 | 2 | 6.1 | 159.0 | 0.803 | 81.40 | 12.48 | |
| 16C | 15 (15) | | 270 | 0.2 | 6.6 | 51.4 | 0.766 | 79.49 | 10.44 | |
| 17C | 10 (9.7) | | 285 | 1.1 | 5.46 | 45.4 | 0.796 | 81.85 | 11.18 | |
| 18C | 10 (10) | | 285 | 1.1 | 6.05 | 43.4 | 0.792 | 78.23 | 10.81 | 30.4 |
| 19C | 15 (15) | | 300 | 2 | 5.05 | 16.2 | 0.771 | 78.61 | 14.00 | |
| 20C | 15 (14.8) | | 300 | 0.2 | 4.857 | 9.5 | 0.791 | 82.34 | 14.15 | |

$$\eta_{int} = \lim_{C \to 0}(\eta_{sp}/C) = \lim_{C \to 0} \ln(\eta_r/C)$$

where $\eta_{int}$=Intrinsic viscosity $\eta_r$=Relative viscosity=$t_s/t_o$ $\eta_{sp}$=Specific viscosity=$\eta_r-1$ Instrument calibration involves replicate testing of a standard reference material and then applying appropriate mathematical equations to produce the "accepted" I.V. values.

Calibration Factor=Accepted IV of Reference Material/Average of Replicate Determinations Corrected IhV=Calculated IhV×Calibration Factor The b* color of samples catalyzed with low concentrations of titanium (i.e. 5 ppm) at a low reaction temperature of 270° C. was less than satisfactory as indicated by its high values above 8.5. See examples 1C and 2C. The residence time to obtain an It.V. of about 0.78 or 0.79 was cut in half from 223 to 123 minutes by decreasing the pressure (increasing the vacuum) from 2 torr to 0.2 torr. The residence time in the antimony catalyzed samples was less than in samples 1C and 2C at equivalent vacuum levels and similar It.V. by using an appropriate amount of antimony catalyst, a higher reaction temperature, or a combination of appropriate antimony catalyst levels and reaction temperatures. See examples 3-10. Not only did the reaction proceed quicker to the target It.V in the antimony catalyzed samples, but the b* color of the base polymer was better in each antimony catalyzed sample compared to samples 1C and 2C at equivalent vacuum levels and similar It.V. It can also be seen that, in antimony catalyzed samples, a b* of about 6 or less can be maintained within a wide processing window, and also within a large variety of different combinations of vacuum, catalyst concentration, and reaction temperatures.

Attempting to reduce the residence time of the titanium catalyzed samples by increasing the reaction temperature, the catalyst concentration, or decreasing the pressure, or a combination of these parameters was successful as seen in comparative examples 11C-12C and 15C-20C. However, the increase in catalyst concentration and/or reaction temperature resulted in the further yellowing of the base polyester polymer as seen in the increase in b* values in many cases, or at best, did not result in any improvement in b* color to a value of less than 6. The results show that dropping the titanium level to 5 ppm at higher temperatures designed to decrease the reaction time results in polyester polymer having an unacceptably high b*. (See 11C-12C).

The results in Table 1 indicate that the antimony catalyzed polyester polymers can be made with a lower b* color on the base polyester polymer compared to titanium catalyzed samples at equivalent inherent viscosities. Moreover, when one adheres to the use of low titanium and low temperature conditions in titanium catalyzed samples, the residence time for making the antimony catalyzed samples was significantly shorter because in the antimony catalyzed reaction, there exists a wide variety of antimony catalyst concentrations and higher reaction temperatures which can be used without significantly increasing the b* color beyond 6.

Example 2

In this series of examples, phosphorus stabilizers were added during the melt-phase synthesis. The type of stabilizer added in all cases was an oligomeric phosphate triester. The amount is varied as shown in Table 2. The lowest phosphorus: metal mole ratio (P:M Z) is zero.

Reheat additives, reducing agents, and toners are not added to the melt in these samples. Each of samples illustrate the P:M Z effect, catalyst level, and temperature on the b* and the L* of high It.V. polyester polymer melt phase products.

A designed experiment varies antimony level (Sb), reaction temperature and/or the phosphorus/Sb molar ratio. The oligomer charge, equipment and antimony catalyst solution are the same as described in Example 1. The vacuum level in the finisher reaction zone is fixed at 0.8 torr in all experiments using Sb compounds as the catalyst. The phosphorus solution is added at stage 5, before initiating polycondensation in stage 7 and after completing the esterification reactions. Vacuum is applied at successive stages as stated in the following array.

| Stage | Time (min.) | Temp. C. ° | Vacuum (torr) | Stir Speed (rpm) |
|---|---|---|---|---|
| 1 | 0.1 | 270 | 730 | 0 |
| 2 | 10 | 270 | 730 | 150* |
| 3 | 2 | 270 | 140 | 300* |
| 4 | 1 | 270 | 140 | 300 |
| 5 | 2 | 270 | 140 | 300 |
| 6 | 10 | 270 | 51* | 300 |
| 7 | 5 | 270 | 51 | 300 |
| 8 | 1 | 270 | 4.5* | 300 |
| 9 | 20 | 270 | 4.5 | 300 |

-continued

| Stage | Time (min.) | Temp. C. ° | Vacuum (torr) | Stir Speed (rpm) |
|---|---|---|---|---|
| 10 | 2 | 270 | 0.8* | 30* |
| 13 | 500# | 270 | 0.8 | 30 |

*= ramp;
= torque termination
when temperature = 300° C., change all 270 to 300 (for 285° C., change all 270 to 285).

Titanium catalyzed samples are prepared using the same procedure as in the Sb catalyzed samples, varying the titanium levels, reaction temperatures, and molar ratios of phosphorus to titanium levels. The oligomer charge, equipment and antimony catalyst solution are the same as described in Example 1. The vacuum in the finisher reaction zone is fixed at 0.2 torr. Using the lowest vacuum possible produces the fastest time to IV, which enables one to better look at the effect of higher P:Ti mole ratios than would otherwise be possible. The phosphorous solution in the titanium catalyzed samples in this example is added at stage 8 between the first and second prepolymerization zones during polycondensation. Vacuum is applied in successive stages as stated in the following array.

| Stage | Time Minutes | Temperature C. ° | Vacuum Torr | Stir Speed rpm |
|---|---|---|---|---|
| 1 | 0.1 | 270 | 730 | 0 |
| 2 | 10 | 270 | 730 | 150* |
| 3 | 2 | 270 | 140 | 300* |
| 4 | 1 | 270 | 140 | 300 |
| 5 | 10 | 270 | 25* | 300 |
| 6 | 10 | 270 | 25 | 300 |
| 7 | 1 | 270 | 140* | 300 |
| 8 | 2 | 270 | 140 | 300 |
| 9 | 1 | 270 | 25* | 300 |
| 10 | 10 | 270 | 25 | 300 |
| 11 | 2 | 270 | 0.2* | 30* |
| 12 | 1 | 270 | 0.2 | 30 |
| 13 | 500# | 270 | 0.2 | 30 |

*= ramp;
= torque termination
when temperature = 300° C., change all 270 to 300 (for 285° C., change all 270 to 285).

The polyester polymer melt phase product samples are tested for L* and b* at either different reaction temperatures, catalyst levels, and/or vacuum levels. The Ih.V. target for each experiment is 0.8 dL/g. In the Ti case, the measured IhV's are within ±0.05 dL/g of the target except for one at 285° C. and two at 300° C. (X28951-168, 169, 187). In the Sb case, the measured IhV's are within ±0.05 dL/g of the target except for one at 270° C. Table 2 sets forth reaction temperatures, catalyst levels, vacuum levels, phosphorus levels, and L* and b* colors.

TABLE 2

| Sample No. | Temp (deg C.) | P/M Ratio | Ti (ppm) | Sb (ppm) | P (ppm) | Time to IV (min) | IhV (dL/g) | L* powder | b* powder | % Crystalinity |
|---|---|---|---|---|---|---|---|---|---|---|
| 21C | 270 | 0 | 10.0 | | 1.90 | 59.55 | 0.749 | 82.80 | 9.70 | 37.8 |
| 22 | 270 | 0 | | 133 | 3 | 182.88 | 0.762 | 80.46 | 8.12 | |
| 23 | 270 | 0 | | 398 | 1 | 75.33 | 0.726 | 79.08 | 3.41 | |
| 24C | 270 | 0 | 20.0 | | 1.25 | 49.50 | 0.751 | 81.45 | 10.66 | |
| 25C | 270 | 0.8 | 18.6 | | 7.90 | 95.07 | 0.784 | 82.10 | 8.42 | |
| 26 | 270 | 0.5 | | 264 | 35 | 92.40 | 0.754 | 82.01 | 5.52 | 40.8 |
| 27C | 270 | 1.6 | 9.5 | | 9.00 | 302.82 | 0.769 | 82.76 | 8.64 | 38.7 |
| 28C | 270 | 1.6 | 19.0 | | 18.00 | 268.50 | 0.750 | 79.81 | 8.22 | |
| 29 | 270 | 1 | | 130 | 29 | 158.84 | 0.761 | 84.79 | 6.81 | |
| 30 | 270 | 1 | | 378 | 102 | 120.73 | 0.765 | 79.09 | 4.29 | |
| 31C | 285 | 0 | 15.0 | | 1.45 | 22.08 | 0.785 | 79.37 | 10.71 | |
| 32 | 285 | 0 | | 267 | 3 | 47.65 | 0.778 | 76.16 | 5.23 | 48.6 |
| 33C | 285 | 0.8 | 10.0 | | 5.50 | 41.17 | 0.782 | 79.98 | 8.82 | 38.8 |
| 34C | 285 | 0.8 | 10.0 | | 5.50 | 43.50 | 0.808 | 81.88 | 10.07 | 38.7 |
| 35C | 285 | 0.8 | 15.1 | | 7.35 | 39.10 | 0.780 | 82.76 | 10.83 | |
| 36C | 285 | 0.8 | 14.8 | | 7.60 | 33.38 | 0.753 | 83.68 | 10.84 | |
| 37C | 285 | 0.8 | 14.7 | | 7.20 | 38.45 | 0.788 | 81.33 | 9.93 | |
| 38C | 285 | 0.8 | 14.6 | | 7.15 | 41.90 | 0.786 | 82.15 | 9.39 | |
| 39C | 285 | 0.8 | 14.7 | | 7.20 | 30.57 | 0.760 | 81.54 | 9.03 | |
| 40C | 285 | 0.8 | 14.7 | | 7.55 | 35.62 | 0.779 | 81.36 | 9.20 | |
| 41C | 285 | 0.8 | 20.0 | | 9.50 | 29.95 | 0.731 | 80.43 | 9.73 | |
| 42 | 285 | 0.5 | | 133 | 17 | 102.30 | 0.785 | 80.73 | 6.02 | |
| 43 | 285 | 0.5 | | 128 | 22 | 87.24 | 0.78 | 83.78 | 7.72 | |
| 44 | 285 | 0.5 | | 259 | 33 | 44.25 | 0.773 | 78.74 | 3.41 | |
| 45 | 285 | 0.5 | | 263 | 32 | 48.98 | 0.769 | 77.74 | 3.77 | |
| 46 | 285 | 0.5 | | 267 | 31 | 42.77 | 0.759 | 79.00 | 4.63 | 42.8 |
| 47 | 285 | 0.5 | | 260 | 32 | 49.75 | 0.771 | 79.73 | 4.37 | |
| 48 | 285 | 0.5 | | 264 | 34 | 52.22 | 0.782 | 76.33 | 2.99 | 40.3 |
| 49 | 285 | 0.5 | | 262 | 34 | 40.97 | 0.746 | 81.79 | 5.23 | |
| 50 | 285 | 0.5 | | 380 | 50 | 42.00 | 0.806 | 74.13 | 3.81 | |
| 51 | 285 | 1 | | 261 | 63 | 49.35 | 0.787 | 76.2 | 3.25 | 26.3 |
| 52C | 300 | 0 | 10.0 | | 1.40 | 13.95 | 0.800 | 82.25 | 11.82 | 34.9 |
| 53C | 300 | 0 | 20.0 | | 1.60 | 13.72 | 0.844 | 80.23 | 13.92 | |
| 54 | 300 | 0 | | 135 | 2 | 44.93 | 0.755 | 81.97 | 9.60 | |
| 55 | 300 | 0 | | 388 | 3 | 10.62 | 0.771 | 77.41 | 3.16 | |
| 56C | 300 | 0.8 | 14.9 | | 7.50 | 13.00 | 0.732 | 80.19 | 11.60 | |
| 57 | 300 | 0.5 | | 262 | 33 | 16.78 | 0.805 | 77.70 | 3.43 | 39.3 |
| 58 | 300 | 1 | | 131 | 31 | 36.73 | 0.788 | 83.32 | 6.09 | |
| 59 | 300 | 1 | | 371 | 90 | 9.65 | 0.754 | 73.62 | 2.78 | |
| 60C | 300 | 1.6 | 20.0 | | 19.00 | 23.08 | 0.737 | 83.68 | 11.49 | |
| 61C | 300 | 1.6 | 10.0 | | 8.00 | 32.95 | 0.778 | 83.07 | 11.59 | |
| 62C | 300 | 1.6 | 10.0 | | 9.00 | 33.35 | 0.781 | 83.69 | 10.91 | 36.4 |
| 63C | 285 | 1.6 | 15.0 | | 15.50 | 90.50 | 0.853 | 80.69 | 10.11 | |

Example 3

This example evaluates the level of colorant that needs to be added to a titanium and an antimony catalyzed fully formulated polyester polymer composition to obtain similar b* color levels; the effect on L* color by the addition of the colorant toners, and the reaction time to reach similar It.V. levels.

In this example, phosphorus thermal stabilizers are added to polyester polymers catalyzed with low levels of titanium (5 ppm) at relatively low temperatures (270° C.). When terminating a polymer run at a torque equivalent to approximately 0.80 IhV, the reaction time was about 155 min. The P/Ti mole ratio was at least one. After the 155 minutes of polymerization time, the vacuum was broken, the phosphorus compound was added, and vacuum was resumed to enhance mixing.

In this example, the phosphorus compound is either phosphoric acid or an oligomeric phosphate triester. To avoid a potential loss in It.V., a concentrated form of the phosphorus compound was used. By using a concentrated form of the phosphorus compound, the amount of solvent present which could hydrolyze or glycolyze the polymer is reduced. Phosphoric acid was added as an 85 weight % solution in water. The smallest amount of phosphoric acid that can be reproducibly added by volume via syringe to the polymer is 0.02 mL, which corresponds to a target of about 80 ppm P in the polymer. Oligomeric phosphate tri-esters were added directly as a 9 wt./wt. % phosphorus solution. The smallest amount of the oligomeric phosphate triesters that could be reproducibly added by volume via syringe to the polymer was 0.02 mL, which corresponds to a target of about 20 ppm P in the polymer.

The following array sets forth the processing conditions for making the titanium catalyzed polymers using about 5 ppm Ti and using the oligomer mixture starting materials and amounts described as in Example 1, except that the oligomeric mixture contained about 1.5 DEG, and the degree of conversion, with some variance among batches, ranged from about 90% to 95%. The phosphorus compounds were added at stage 12. Two polymer runs were made per the following array, one for the addition of phosphoric acid, and one for the addition of oligomeric phosphate triesters.

| Stage | Time minutes | Temp C. ° | Vacuum torr | Stir Speed rpm |
|---|---|---|---|---|
| 1 | 0.1 | 270 | 730 | 0 |
| 2 | 10 | 270 | 730 | 150 |
| 3 | 2 | 270 | 140 | 300 |
| 4 | 1 | 270 | 140 | 300 |
| 5 | 10 | 270 | 51 | 300 |
| 6 | 5 | 270 | 51 | 300 |
| 7 | 1 | 270 | 4.5 | 300 |
| 8 | 20 | 270 | 4.5 | 300 |
| 9 | 2 | 270 | 0.8 | 30 |
| 10 | 155 | 270 | 0.8 | 30 |
| 11 | 3 | 270 | 650 | 30 |
| 12 | 2 | 270 | 650 | 30 |
| 13 | 1 | 270 | 0.5 | 45 |
| 14 | 5 | 270 | 0.5 | 45 |

\* = ramp;
= torque termination
when temperature = 300° C., change all 270 to 300 (for 285° C., change all 270 to 285).

Typical conditions for polymerizations catalyzed by antimony compounds are at about 285° C. and about 250 ppm Sb in the polymer. When terminating a polymer run at a torque equivalent to approximately 0.80 IhV, the reaction time was about 58 minutes. The following array was used for runs catalyzed by about 250 ppm Sb using the same oligomeric mixture as in Example 1, except that the oligomeric mixture contained about 1.5 DEG, and the degree of conversion, with some variance among batches, ranged from about 90% to 95%. The phosphorus compound(s) was added in stage 12. Two polymer runs were conducted per the following array, one for the addition of phosphoric acid, and one for the addition of oligomeric phosphate tri-esters.

| Stage | Time Minutes | Temperature C. ° | Vacuum torr | Stir Speed rpm |
|---|---|---|---|---|
| 1 | 0.1 | 285 | 730 | 0 |
| 2 | 10 | 285 | 730 | 150 |
| 3 | 2 | 285 | 140 | 300 |
| 4 | 1 | 285 | 140 | 300 |
| 5 | 10 | 285 | 51 | 300 |
| 6 | 5 | 285 | 51 | 300 |
| 7 | 1 | 285 | 4.5 | 300 |
| 8 | 20 | 285 | 4.5 | 300 |
| 9 | 2 | 285 | 0.8 | 30 |
| 10 | 58 | 285 | 0.8 | 30 |
| 11 | 3 | 285 | 650 | 30 |
| 12 | 2 | 285 | 650 | 30 |
| 13 | 1 | 285 | 0.5 | 45 |
| 14 | 5 | 285 | 0.5 | 45 |

\* = ramp;
= torque termination
when temperature = 300° C., change all 270 to 300 (for 285° C., change all 270 to 285).

Table 3 sets forth analytical results comparing the titanium catalyzed and the antimony catalyzed polymers stabilized with phosphoric acid. Blue and red organic toners were added to target a disc b* color target of about 2 CIELAB units. A small amount (0.0005 g) of black iron oxide from Ferro, was added to increase the reheat rate of the Ti-catalyzed polymer to match the reheat rate of the Sb-catalyzed polymer.

TABLE 3

| Catalyst | Red Toner (ppm) | Blue Toner (ppm) | P ppm | ItV dL/g | 3 disc L* | 3 disc a* | 3 disc b* | RHI (Ref. 9921W) | Powder L* Color | Powder a* Color | Powder b* Color | % Crystalinity |
|---|---|---|---|---|---|---|---|---|---|---|---|---|
| Ti | 7.6 | 15.2 | 81 | 0.809 | 75.47 | −0.99 | 1.80 | 0.99 | 74.86 | −1.35 | −2.84 | 38.1 |
| Sb | 6.29 | 12.58 | 87 | 0.848 | 73.81 | 0.59 | 2.97 | 0.987 | 74.3 | −0.41 | −2.9 | 34.7 |

Table 4 sets forth analytical results comparing the titanium catalyzed and the antimony catalyzed polymers stabilized with an oligomeric phosphate tri-ester. Blue and red organic toners were added to target a disc b* color target of about 2 CIELAB units. The reheat rates of the Ti-catalyzed polymer matched that of the Sb-catalyzed polymer within test error; therefore no black iron oxide was added.

TABLE 4

| Catalyst | Red Toner ppm | Blue Toner ppm | P ppm | ItV dL/g | 3 disc L* | 3 disc a* | 3 disc b* | RHI (Ref. 9921W) | Powder L* | Powder a* | Powder b* | % Crystalinity |
|---|---|---|---|---|---|---|---|---|---|---|---|---|
| Ti | 8.69 | 17.39 | 15 | 0.855 | 75.68 | 0.03 | 0.92 | 0.97 | 73.69 | −0.69 | −4 | 39.3 |
| Sb | 6.69 | 13.38 | 18 | 0.881 | 77.27 | 1.19 | 2.54 | 0.967 | 75.91 | 0.12 | −2.62 | 38.5 |

When the disc b* color (+/−2) and reheat are made similar with toners and reheat additives (when needed), less toner was added to the Sb catalyzed polymer to provide similar b* color. However, the polymer catalyzed with 250 ppm Sb at 285° C. has the distinct advantage of a much shorter reaction time than polymer catalyzed by the 5 ppm Ti at 270° C.

scenario to attain the same It.V., while maintaining at least comparable brightness and yellowness.

Example 4

In example 3, the finisher residence time of the low Ti/low temperature option was about 2.7 times longer than that of the option with 250 ppm Sb and 285° C. To compare color between the two catalyst systems when the finisher residence times are more similar, the titanium level in this example is increased to 10 ppm and the temperature is kept at 270° C. The following array is used for these runs.

| Stage | Time minutes | Temperature C. ° | Vacuum torr | Stir Speed rpm |
|---|---|---|---|---|
| 1 | 0.1 | 270 | 730 | 0 |
| 2 | 10 | 270 | 730 | 150 |
| 3 | 2 | 270 | 140 | 300 |
| 4 | 1 | 270 | 140 | 300 |
| 5 | 10 | 270 | 51 | 300 |
| 6 | 5 | 270 | 51 | 300 |
| 7 | 1 | 270 | 4.5 | 300 |
| 8 | 20 | 270 | 4.5 | 300 |
| 9 | 2 | 270 | 0.8 | 30 |
| 10 | 66 | 270 | 0.8 | 30 |
| 11 | 3 | 270 | 650 | 30 |
| 12 | 2 | 270 | 650 | 30 |
| 13 | 1 | 270 | 0.5 | 45 |
| 14 | 5 | 270 | 0.5 | 45 |

\* = ramp;
= torque termination
when temperature = 300° C., change all 270 to 300 (for 285° C., change all 270 to 285).

Under these conditions, the finisher time for Ti-catalyzed runs was around 66 min. The smallest amount of the oligomeric phosphate triesters that was reproducibly added by volume via syringe to the polymer is 0.02 mL, which corresponds to a target of about 20 ppm P in the polymer.

In the following table 5, the Sb run is the same one shown earlier in Example 3, using the oligomeric phosphate tri-ester as the phosphorus source (Table 4). The reheat rate of the Ti-catalyzed polymer matched that of the Sb-catalyzed polymer within test error; therefore, no black iron oxide was added. Red and blue toners were added at levels sufficient to target similar b* colors. Table 5 sets forth the results analyzed for a*, b* and L* color.

times. The L* brightness of Sb catalyzed polymer was higher than the L* brightness of the titanium catalyzed polymer.

Example 5

To further compare color between the two catalyst systems when the finisher residence time is more similar, in this case the titanium level was kept at 5 ppm while the reaction temperature was increased to 289° C. The following array was used.

| Stage | Time minutes | Temperature C. ° | Vacuum torr | Stir Speed Rpm |
|---|---|---|---|---|
| 1 | 0.1 | 289 | 730 | 0 |
| 2 | 10 | 289 | 730 | 150* |
| 3 | 2 | 289 | 140 | 300* |
| 4 | 1 | 289 | 140 | 300 |
| 5 | 10 | 289 | 51* | 300 |
| 6 | 5 | 289 | 51 | 300 |
| 7 | 1 | 289 | 4.5* | 300 |
| 8 | 20 | 289 | 4.5 | 300 |
| 9 | 2 | 289 | 0.8* | 30* |
| 10 | 48 | 289 | 0.8 | 30 |
| 11 | 3 | 289 | 650* | 30 |
| 12 | 2 | 289 | 650 | 30 |
| 13 | 1 | 289 | 0.5* | 45* |
| 14 | 5 | 289 | 0.5 | 45 |

\*= ramp;
= torque termination
when temperature = 300° C., change all 270 to 300 (for 285° C., change all 270 to 285).

Under these conditions, the finisher time for the Ti-catalyzed run was about 48 minutes. The smallest amount of the oligomeric phosphate triesters that was reproducibly added by volume via syringe to the polymer is 0.02 mL, which corresponds to a target of about 20 ppm P in the polymer.

In the following table, the Sb run is the same one shown earlier in Example 3, Table 4. The reheat rate of the Ti-catalyzed polymer matched that of the Sb-catalyzed polymer within test error; therefore, no black iron oxide was added. Red and blue toners were added at levels sufficient to target similar b* colors. Due to the difficulties encountered in attempting to target similar b*, test variability, or one run wherein a high amount of phosphorus was added, the results of each titanium run are reported. Table 6 sets forth the results analyzed for a*, b* and L* color.

TABLE 5

| Catalyst | Red Toner ppm | Blue Toner ppm | P ppm | ItV dL/g | 3 disc L* | 3 disc a* | 3 disc b* | RHI (Ref. 9921W) | Powder L* | Powder a* | Powder b* | % Crystalinity |
|---|---|---|---|---|---|---|---|---|---|---|---|---|
| Ti | 9.06 | 18.13 | 12 | 0.816 | 73.80 | 0.06 | 1.84 | 0.993 | 74.76 | −0.58 | −4.8 | 37.2 |
| Sb | 6.69 | 13.38 | 18 | 0.881 | 77.27 | 1.19 | 2.54 | 0.967 | 75.91 | 0.12 | −2.62 | 38.5 |

The results indicate that less toners have to be added in an Sb catalyzed polymer to provide similar b* color to a titanium catalyzed polymer when the latter is made at similar reaction

TABLE 6

| Catalyst | Red Toner ppm | Blue Toner ppm | P ppm | ItV dL/g | 3 disc L* | 3 disc a* | 3 disc b* | RHI (Ref. 9921W) | Powder L* | Powder a* | Powder b* | % Crystalinity |
|---|---|---|---|---|---|---|---|---|---|---|---|---|
| Ti | 7.69 | 15.39 | 13 | 0.898 | 73.80 | −0.24 | 4.19 | 0.997 | 73.3 | −0.87 | −2.41 | 34.1 |
| Ti | 7.69 | 15.39 | 13 | 0.899 | 74.64 | −1.18 | 2.36 | 0.993 | 73.69 | −1.37 | −3 | 34.7 |
| Ti | 7.69 | 15.39 | 25 | 0.866 | 75.01 | −2.14 | 1.02 | 0.996 | 74.29 | −1.91 | −2.96 | 34.1 |
| Sb | 6.69 | 13.38 | 18 | 0.881 | 77.27 | 1.19 | 2.54 | 0.967 | 75.91 | 0.12 | −2.62 | 38.5 |

The results indicate that less toner is added to an antimony catalyzed polymer to provide similar b* color to a titanium catalyzed polymer reacted with comparable fast reaction times. The L* of the Sb catalyzed polymer was also brighter than the L* of any of the Ti catalyzed polymers.

What we claim is:

1. A process for making a polyester polymer melt phase product comprising:
   a) esterifying or transesterifying a hydroxyl component and a dicarboxylic acid component comprising dicarboxylic acids, dicarboxylic acid derivatives, and mixtures thereof to produce an oligomeric mixture;
   b) polycondensing the oligomeric mixture in a polycondensation zone to produce a polyester polymer melt having an It.V. of at least 0.75 dL/g; and
   c) before the It.V. of the polyester polymer melt reaches 0.45 dL/g, adding an antimony containing catalyst to the oligomeric mixture or the polyester polymer melt or both, in any amount to provide from 180 ppm to 500 ppm antimony, based on the weight of the polyester polymer melt phase product; and
   d) adding a catalyst stabilizer to the polyester polymer melt;
wherein the polyester polymer melt phase product has a b* color of −5 to +5 and an L* of at least 70.

2. The process of claim 1, wherein the polyester polymer melt phase product has an L* of at least 74.

3. The process of claim 1, comprising conducting said polycondensation reaction in the polycondensation zone at a temperature ranging from 270° C. to 300° C. throughout the polycondensation reaction commencing no later than when the It.V. of the melt reaches 0.45 dL/g and continuing at least until the It.V. of the melt reaches 0.75 dUg.

4. The process of claim 1, wherein the reaction time to reach an It.V. of about 0.70 dL/g commencing from an It.V. in the melt of about 0.3 dL/g is 100 minutes or less.

5. The process of claim 1, comprising adding a phosphorous containing compound as the catalyst stabilizer at a molar ratio of P:Sb of at least 0.025:1.

6. The process of claim 1, further adding to the melt a compound which reduces antimony to a zero oxidation state.

7. The process of claim 1, comprising adding a bluing toner.

8. The process of claim 1, wherein the polyester polymer melt phase product comprises:
   (a) a carboxylic acid component comprising at least 92 mole % of the residues of terephthalic acid or derivates of terephthalic acid, and
   (b) a hydroxyl component comprising at least 92 mole % of the residues of ethylene glycol,
   based on 100 mole percent of carboxylic acid component residues and 100 mole percent of hydroxyl component residues in the polyester polymer melt phase product.

* * * * *

UNITED STATES PATENT AND TRADEMARK OFFICE
CERTIFICATE OF CORRECTION

| | |
|---|---|
| PATENT NO. | : 7,786,247 B2 |
| APPLICATION NO. | : 11/361487 |
| DATED | : August 31, 2010 |
| INVENTOR(S) | : Jernigan et al. |

It is certified that error appears in the above-identified patent and that said Letters Patent is hereby corrected as shown below:

Column 34, Claim 3, Line 18 "dUg" should read -- dL/g --

Signed and Sealed this

Twelfth Day of October, 2010

David J. Kappos
*Director of the United States Patent and Trademark Office*